(12) United States Patent
Kawai et al.

(10) Patent No.: US 11,750,940 B2
(45) Date of Patent: Sep. 5, 2023

(54) IMAGING APPARATUS, OPERATION METHOD THEREOF, AND OPERATION PROGRAM THEREOF

(71) Applicant: FUJIFILM Corporation, Tokyo (JP)

(72) Inventors: Tomoyuki Kawai, Saitama (JP); Koichi Tanaka, Saitama (JP); Junya Kitagawa, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/049,639

(22) Filed: Oct. 26, 2022

(65) Prior Publication Data

US 2023/0199336 A1 Jun. 22, 2023

Related U.S. Application Data

(63) Continuation of application No. PCT/JP2021/010394, filed on Mar. 15, 2021.

(30) Foreign Application Priority Data

May 19, 2020 (JP) .............................. JP2020-087572

(51) Int. Cl.
*H04N 25/42* (2023.01)
*G02B 7/36* (2021.01)
(Continued)

(52) U.S. Cl.
CPC .............. *H04N 25/42* (2023.01); *G02B 7/08* (2013.01); *G02B 7/36* (2013.01); *H04N 23/632* (2023.01);
(Continued)

(58) Field of Classification Search
CPC ........ H04N 25/42; H04N 25/46; H04N 25/44; H04N 23/632; H04N 23/00; H04N 23/60;
(Continued)

(56) References Cited

U.S. PATENT DOCUMENTS

2015/0070561 A1 3/2015 Oguchi
2018/0278856 A1 9/2018 Uemura
(Continued)

FOREIGN PATENT DOCUMENTS

JP H04273675 9/1992
JP H0564162 3/1993
(Continued)

OTHER PUBLICATIONS

"International Search Report (Form PCT/ISA/210) of PCT/JP2021/010394," dated Jun. 8, 2021, with English translation thereof, pp. 1-5.
(Continued)

*Primary Examiner* — Antoinette T Spinks
(74) *Attorney, Agent, or Firm* — JCIPRNET

(57) ABSTRACT

An imaging apparatus includes: an imaging sensor; a lens mount to which a lens is attached; and a processor is configured to read out an imaging signal from the imaging sensor and generate a raw image. The processor is configured to determine a length of a second focal length in a second direction which intersects with an extending direction of an optical axis of the lens and a first direction which intersects with the extending direction, relative to a first focal length in the first direction, and make a resolution ratio, which is a ratio of a resolution of the raw image in the first direction to a resolution of the raw image in the second direction, higher than a resolution ratio of the imaging sensor in a case where the second focal length is longer than the first focal length.

20 Claims, 21 Drawing Sheets

(51) Int. Cl.
*G02B 7/08* (2021.01)
*H04N 25/46* (2023.01)
*H04N 23/63* (2023.01)
*H04N 25/44* (2023.01)
*G03B 17/14* (2021.01)

(52) U.S. Cl.
CPC ............. *H04N 25/44* (2023.01); *H04N 25/46* (2023.01); *G03B 17/14* (2013.01)

(58) Field of Classification Search
CPC ...... H04N 25/445; H04N 25/704; G02B 7/08; G02B 7/36; G02B 7/34; G03B 17/14; G03B 13/36
See application file for complete search history.

(56) References Cited

U.S. PATENT DOCUMENTS

2022/0408042 A1* 12/2022 Tanaka ................. H04N 25/704
2023/0113929 A1* 4/2023 Armiento ............... C09D 11/52
106/31.92

FOREIGN PATENT DOCUMENTS

JP 2015055737 3/2015
JP 2018157479 10/2018

OTHER PUBLICATIONS

"Written Opinion of the International Searching Authority (Form PCT/ISA/237)" of PCT/JP2021/010394, dated Jun. 8, 2021, with English translation thereof, pp. 1-8.

* cited by examiner

COMPRESSION AT MAGNIFICATION OF 1/Rf IN X DIRECTION

SAME COMPRESSION IN BOTH X DIRECTION AND Y DIRECTION

COMPRESSION AT MAGNIFICATION OF 1/2

IMAGING APPARATUS, OPERATION METHOD THEREOF, AND OPERATION PROGRAM THEREOF

CROSS-REFERENCE TO RELATED APPLICATIONS

This application is a Continuation of PCT International Application No. PCT/JP2021/010394 filed on Mar. 15, 2021, which claims priority under 35 U.S.C § 119(a) to Japanese Patent Application No. 2020-087572 filed on May 19, 2020. Each of the above application(s) is hereby expressly incorporated by reference, in its entirety, into the present application.

BACKGROUND OF THE INVENTION

1. Field of the Invention

The technology of the present disclosure relates to an imaging apparatus, an operation method thereof, and an operation program thereof.

2. Description of the Related Art

JP1992-273675A (JP-H04-273675A) discloses a camera-integrated VTR provided with a camera unit that captures an image laterally compressed by an anamorphic lens, an anamorphic lens detection device, a switch that guides a signal from the camera unit to a decompression circuit by means of a signal from this device, and an electric viewfinder that displays an image which is easy to see from the decompression circuit.

JP1993-064162A (JP-H05-064162A) discloses an image signal processing apparatus provided with an image processing unit that performs compression processing or decompression processing on the image signal such that vertical and horizontal compression ratios or decompression ratios are 1:1 in accordance with the vertical and horizontal compression ratios or decompression ratios of the input image signal.

SUMMARY OF THE INVENTION

An embodiment according to the technique of the present disclosure provides an imaging apparatus capable of obtaining an image corresponding to an anamorphic lens without performing post-processing, an operation method thereof, and an operation program thereof.

In order to achieve the above-mentioned object, the imaging apparatus includes: an imaging sensor; a lens mount to which a lens forming an image of a ray onto the imaging sensor is attached; and a processor that reads out an imaging signal from the imaging sensor and generates a raw image. The processor is configured to determine a length of a second focal length in a second direction which intersects with an extending direction of an optical axis of the lens and a first direction which intersects with the extending direction, relative to a first focal length in the first direction, and make a resolution ratio, which is a ratio of a resolution of the raw image in the first direction to a resolution of the raw image in the second direction, higher than the resolution ratio of the imaging sensor in a case where the second focal length is longer than the first focal length.

It is preferable that the imaging sensor has a plurality of pixels arranged along the first direction and the second direction. In addition, it is preferable that in a case where the second focal length is longer than the first focal length, the processor is configured to perform pixel thinning-out readout in at least the second direction of the first direction and the second direction so as to make the resolution ratio of the raw image higher than the resolution ratio of the imaging sensor.

It is preferable that the pixel thinning-out readout is a thinning-out readout by addition, in which the number of imaging signals of a plurality of pixels is reduced by adding and reading out the imaging signals.

It is preferable that in a case where the second focal length is longer than the first focal length, the processor matches the resolution ratio of the raw image with a focal length ratio of the second focal length to the first focal length.

It is preferable that in a case where the focal length ratio is 4/3, the processor sets the resolution ratio of the raw image to 4/3 by performing a 1/3 pixel thinning-out readout in the first direction and a 1/4 pixel thinning-out readout in the second direction.

It is preferable that the processor is configured to: read out storage information about the first focal length and the second focal length stored in the lens; and determine a length of the second focal length relative to the first focal length on the basis of the storage information so as to determine the resolution ratio of the raw image on the basis of the storage information, in a case where the second focal length is longer than the first focal length.

It is preferable that the processor is configured to: receive user's input information about the first focal length and the second focal length; and determine a length of the second focal length relative to the first focal length on the basis of the input information so as to determine the resolution ratio of the raw image on the basis of the input information, in a case where the second focal length is longer than the first focal length.

The imaging apparatus further includes a display that displays an image on the basis of the imaging signal during imaging or after imaging. It is preferable that the processor is configured to selectively execute a first display mode in which a first image is displayed on the display and a second display mode in which a second image is displayed on the display, and an aspect ratio, which is a ratio of a length of the first image in the first direction to a length of the first image in the second direction, is greater than an aspect ratio of the second image.

It is preferable that the processor is configured to: receive user's selection information about selection of the first display mode and the second display mode; and execute the first display mode or the second display mode on the basis of the selection information.

It is preferable that the first display mode is a mode in which the imaging signal which is read out from the imaging sensor is displayed as the first image in a state where the aspect ratio is maintained, and the second display mode is a mode in which the imaging signal which is read out from the imaging sensor is displayed as the second image of which the aspect ratio is converted on the basis of the first focal length and the second focal length.

It is preferable that the processor is configured to regardless of user's selection of the first display mode or the second display mode, store the raw image, which is generated by reading out the imaging signal from the imaging sensor, in a storage unit.

It is preferable that the processor is configured to: receive a user's focusing confirmation instruction for confirmation of a focusing state; and execute an enlarged display mode, in which the first image is enlarged and displayed on the display on the basis of the focusing confirmation instruction, in a case where the second display mode is selected.

It is preferable that the processor is configured to: generate an image file by adding information about the first focal length and the second focal length to the raw image; and store the generated image file in the storage unit.

It is preferable that the processor includes an optical filter that separates a plurality of rays incident from the lens, and the plurality of rays separated by the optical filter are incident on the imaging sensor.

It is preferable that the optical filter is able to change a first separation width of the rays in the first direction and a second separation width of the rays in the second direction, and the processor is configured to increase the second separation width relative to the first separation width in a case where the second focal length is longer than the first focal length.

It is preferable that the raw image generated by reading out the imaging signal from the imaging sensor is stored as a RAW image file in a storage unit.

A method of operating an imaging apparatus according to the present disclosure is an operation method of imaging apparatus including an imaging sensor, and a lens mount to which a lens forming an image of a ray onto the imaging sensor is attached. The operation method includes: determining a magnitude of a second focal length in a second direction which intersects with an extending direction of an optical axis of the lens and a first direction which intersects with the extending direction, relative to a first focal length in the first direction; and making a resolution ratio, which is a ratio of a resolution of a raw image generated by reading out an imaging signal from the imaging sensor in the first direction to a resolution of the raw image in the second direction, higher than a resolution ratio of the imaging sensor in a case where the second focal length is longer than the first focal length.

An operation program of the present disclosure operates an imaging apparatus includes an imaging sensor, a lens mount to which a lens forming an image of a ray onto the imaging sensor is attached, and a processor that reads out an imaging signal from the imaging sensor and generates a raw image. The operation program causing the processor to execute: determining a length of a second focal length in a second direction which intersects with an extending direction of an optical axis of the lens and a first direction which intersects with the extending direction, relative to a first focal length in the first direction; and making a resolution ratio, which is a ratio of a resolution of the raw image in the first direction to a resolution of the raw image in the second direction, higher than a resolution ratio of the imaging sensor in a case where the second focal length is longer than the first focal length.

DESCRIPTION OF THE PREFERRED EMBODIMENTS

An example of an embodiment relating to the technique of the present disclosure will be described with reference to the accompanying drawings.

First, the wording used in the following description will be described.

In the following description, the "CPU" is an abbreviation for "Central Processing Unit". The "ROM" is an abbreviation for "Read Only Memory". The "RAM" is an abbreviation for "Random Access Memory". The "DRAM" is an abbreviation for "Dynamic Random Access Memory". The "SRAM" is an abbreviation for "Static Random Access Memory". The "CMOS" is an abbreviation for "Complementary Metal Oxide Semiconductor".

The "FPGA" is an abbreviation for "Field-Programmable Gate Array". The "PLD" is an abbreviation for "Programmable Logic Device". The "ASIC" is an abbreviation for "Application Specific Integrated Circuit". The "OVF" is an abbreviation for "Optical View Finder". The "EVF" is an abbreviation for "Electronic View Finder".

As used herein, the term "equal" includes not only being exactly equal, but also being substantially equal in the sense that it includes errors that are generally tolerated in the art of the technique of the present disclosure. Further, as used herein, the term "match" includes not only exactly matching, but also substantially matching in the sense that it includes errors that are generally tolerated in the art of the technique of the present disclosure.

First Embodiment

As a first embodiment of the imaging apparatus, the technique of the present disclosure will be described by using an interchangeable lens digital camera as an example.

Figure 1:
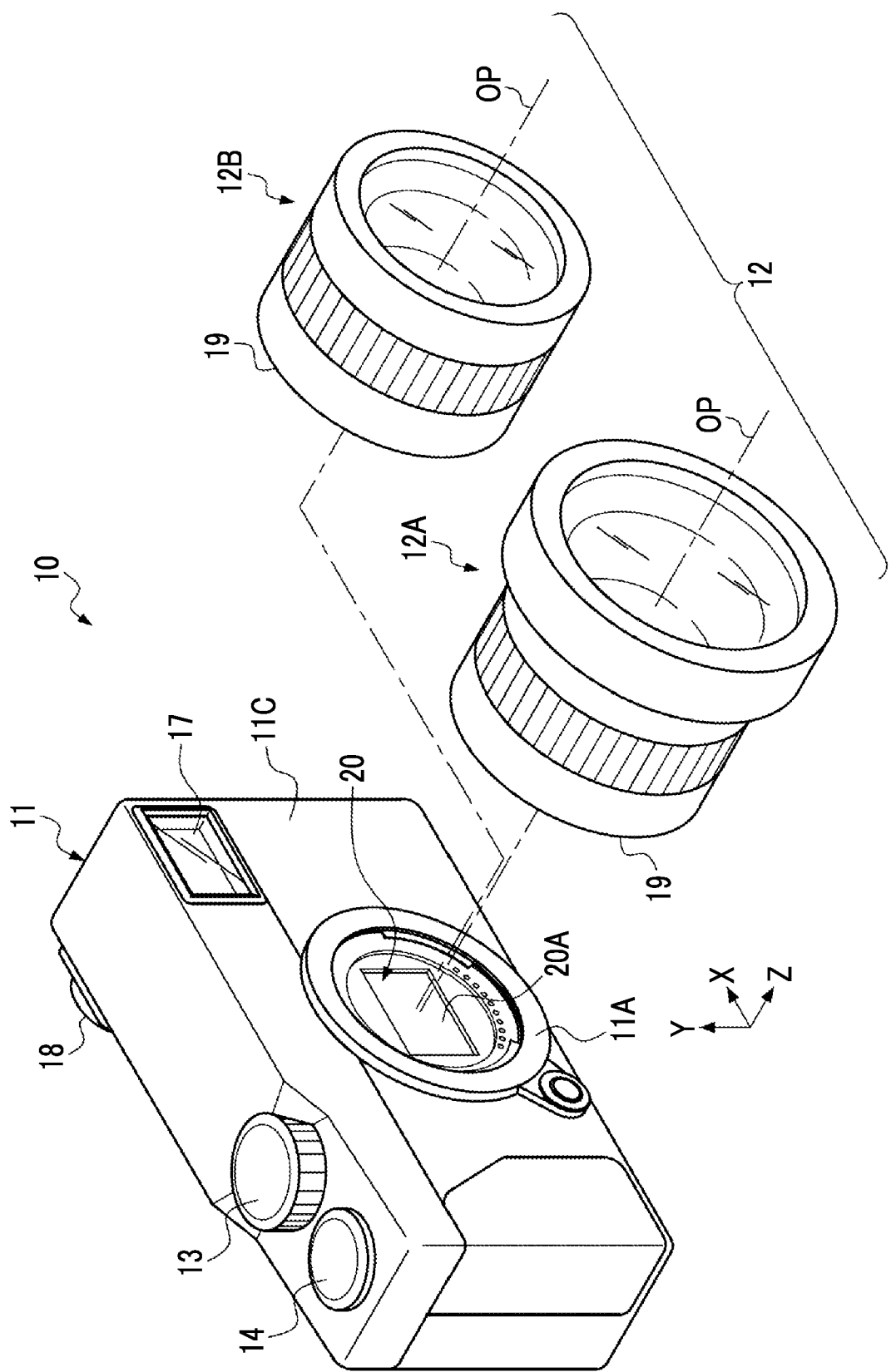
FIG. 1 is a schematic perspective view showing a front side of an imaging apparatus.

As shown in FIG. 1, the imaging apparatus 10 is an interchangeable lens digital camera. The imaging apparatus 10 is composed of a body 11 and an imaging lens 12 which is interchangeably mounted on the body 11. The imaging lens 12 that can be mounted on the body 11 includes various lenses having different optical characteristics. In the present embodiment, the imaging lens 12 includes a first lens 12A which is an anamorphic lens that compresses a visual field in one direction to form an image, and a second lens 12B which is a normal single focus lens. Hereinafter, in a case where it is not necessary to distinguish between types of the imaging lens 12, the types are simply referred to as the imaging lens 12.

In the following description, a first direction which intersects with an extending direction of an optical axis OP of the imaging lens 12 is referred to as an X direction. In addition, a second direction which intersects with the extending direction of the optical axis OP and the first direction is referred to as a Y direction. Further, the extending direction of the optical axis OP is referred to as a Z direction. For example, the X, Y, and Z directions are orthogonal to one another. In a normal usage aspect of the imaging apparatus 10, the X direction corresponds to the horizontal direction and the Y direction corresponds to the vertical direction.

A camera side mount 11A is provided on a front surface 11C of the body 11. The imaging lens 12 is provided with a lens side mount 19 on a rear end side. By attaching the lens side mount 19 to the camera side mount 11A, the imaging lens 12 is connected to the body 11. The camera side mount 11A is an example of the lens mount according to the technique of the present disclosure.

The body 11 is provided with an imaging sensor 20. In the imaging sensor 20, a light-receiving surface 20A is exposed from an opening of the camera side mount 11A. In a case where the imaging lens 12 is mounted on the body 11, the imaging lens 12 forms an image of rays from a subject on the light-receiving surface 20A of the imaging sensor 20. The imaging sensor 20 generates an imaging signal by imaging light imaged on the light-receiving surface 20A.

A dial 13 and a release button 14 are provided on an upper surface of the body 11. The dial 13 is operated in a case of setting the operation mode or the like. Examples of the operation mode of the imaging apparatus 10 include a still image capturing mode and an image display mode. The release button 14 is operated in order to execute still image capturing. The release button 14 is a two-stage switch composed of a first switch which is turned on in response to half-press and a second switch which is turned on in response to full-press.

The body 11 is provided with a finder 17. Here, the finder 17 is a hybrid finder (registered trademark). The hybrid finder indicates a finder in which, for example, an optical view finder (hereinafter, referred to as "OVF") and an electronic view finder (hereinafter, referred to as "EVF") are selectively used.

Figure 2:
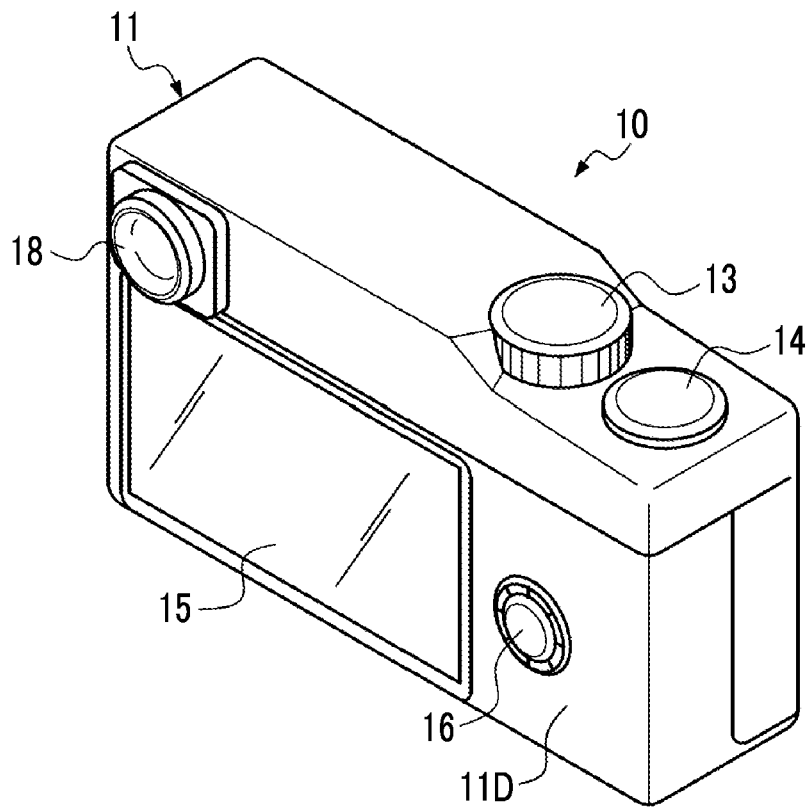
FIG. 2 is a schematic perspective view showing a rear side of the imaging apparatus.

As shown in FIG. 2, a display 15, an instruction button 16, and a finder eyepiece portion 18 are provided on the rear surface 11D of the body 11. The display 15 displays an image on the basis of an imaging signal obtained by imaging, various menu screens, and the like. The display 15 and the EVF of the finder 17 are examples of "a display that displays an image on the basis of an imaging signal during or after imaging" according to the technique of the present disclosure, respectively.

The instruction button 16 receives various instructions. Here, the "various instructions" are, for example, an instruction to display a menu screen on which various menus can be selected, an instruction to select one or a plurality of menus, an instruction to confirm the selected contents, an instruction to delete the selected contents, and various instructions such as autofocus mode, manual focus mode, and frame advance. In addition, the body 11 is provided with a power switch and the like.

An optical image which can be visually recognized by the OVF and a live view image that is an electronic image which can be visually recognized by the EVF are selectively projected on the finder eyepiece portion 18. A user is able to observe an optical image or a live view image of the subject through the finder eyepiece portion 18.

Figure 3:
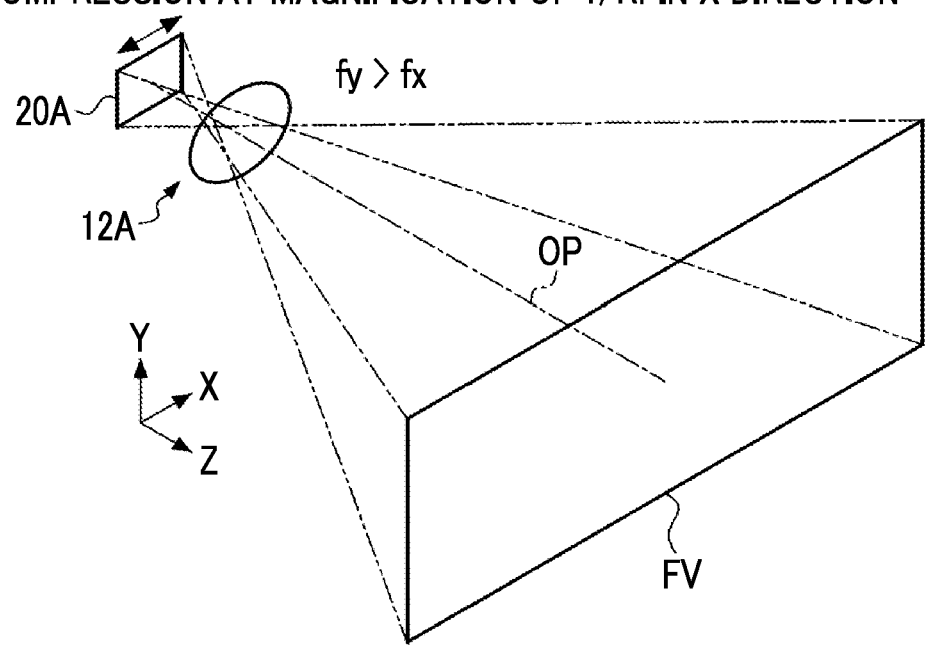
FIG. 3 is a schematic diagram showing optical characteristics of a first lens.

FIG. 3 schematically shows optical characteristics of the first lens 12A which is an anamorphic lens. In the first lens 12A, a focal length fx in the X direction (hereinafter referred to as a first focal length) and a focal length fy in the Y direction (hereinafter referred to as a second focal length) are different from each other. In the first lens 12A, the second focal length fy is longer than the first focal length fx.

Further, in a case where a ratio (fy/fx) of the second focal length fy to the first focal length fx is represented as a focal length ratio Rf, the first lens 12A has a relationship of "Rf>1".

Since the first lens 12A has a relationship of "fy>fx", a visual field FV of the first lens 12A is longer in the X direction than that of the second lens 12B. The first lens 12A compresses the visual field FV long in the X direction to a magnification of 1/Rf in the X direction and forms an image on the light-receiving surface 20A of the imaging sensor 20.

For example, as types of the first lens 12A, there are a type having a relationship of "Rf=2" and a type having a relationship of "Rf=4/3". For example, the first lens 12A having a relationship of "Rf=2" compresses the visual field FV to a magnification of 1/2 in the X direction and forms an image on the light-receiving surface 20A of the imaging sensor 20. The first lens 12A having a relationship of "Rf=4/3" compresses the visual field FV to a magnification of 3/4 in the X direction and forms an image on the light-receiving surface 20A of the imaging sensor 20.

Figure 4:
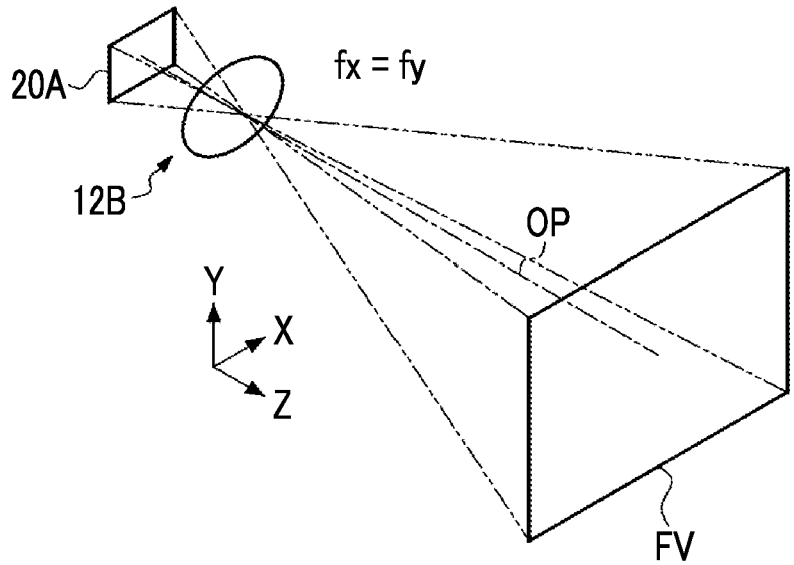
FIG. 4 is a schematic diagram showing optical characteristics of a second lens.

FIG. 4 schematically shows optical characteristics of the second lens 12B. In the second lens 12B, the first focal length fx is equal to the second focal length fy. Therefore, the second lens 12B performs the same compression on the visual field FV in both the X direction and the Y direction to form an image on the light-receiving surface 20A of the imaging sensor 20.

Figure 5:
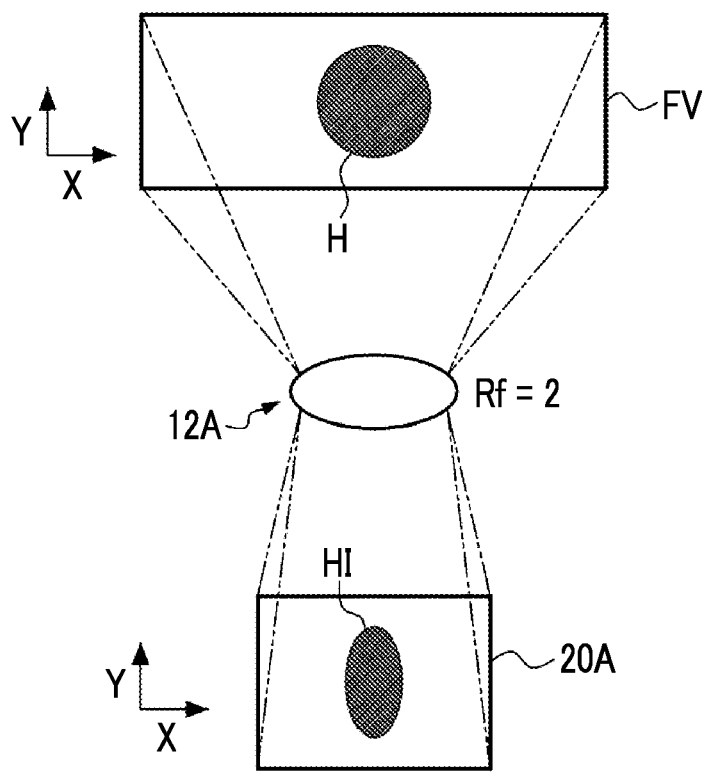
FIG. 5 is a diagram showing image conversion of a subject using the first lens.

FIG. 5 shows image conversion of the subject through the first lens 12A. As shown in FIG. 5, for example, in a case where "Rf=2", the first lens 12A forms a subject image HI, which is obtained by compressing a shape of a subject H by a magnification of 1/2 in the X direction, on the light-receiving surface 20A of the imaging sensor 20.

Figure 6:
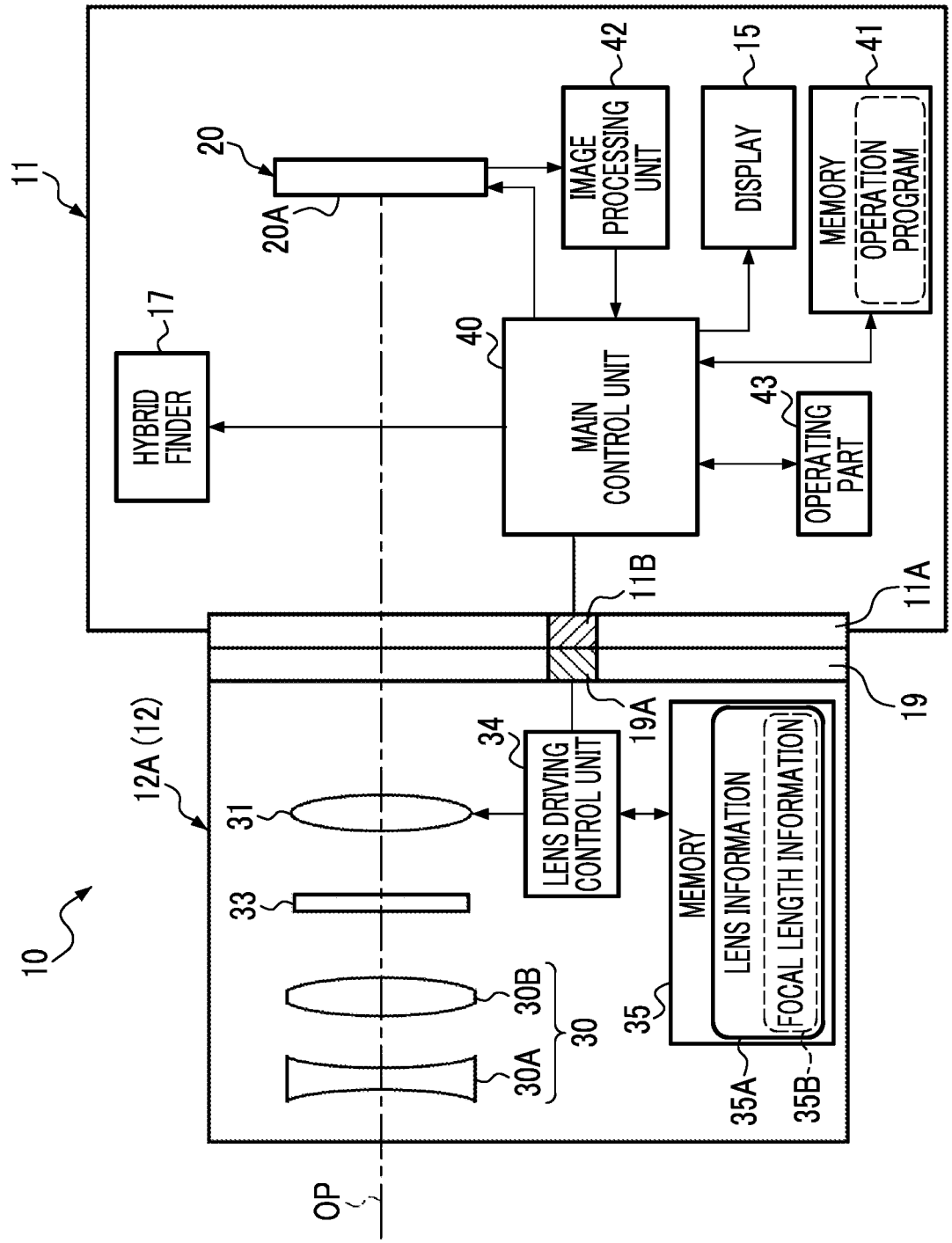
FIG. 6 is a schematic view showing an internal configuration of the imaging apparatus.

FIG. 6 shows an internal configuration of the imaging apparatus 10. FIG. 6 shows an example in which the first lens 12A is attached onto the body 11. The body 11 and the first lens 12A are electrically connected by contact between an electric contact 11B provided on the camera side mount 11A and an electric contact 19A provided on the lens side mount 19. The first lens 12A may be attached onto the distal end of another lens (for example, the second lens 12B).

The first lens 12A includes a cylindrical lens 30, a focus lens 31, and a stop 33. The members are arranged in the order of the cylindrical lens 30, the stop 33, and the focus lens 31 from the objective side along the extending direction of the optical axis OP of the first lens 12A.

The cylindrical lens 30 includes a concave cylindrical lens 30A and a convex cylindrical lens 30B. The first focal length fx and the second focal length fy described above are determined by respective shapes of the concave cylindrical lens 30A and the convex cylindrical lens 30B.

The cylindrical lens 30 and the focus lens 31 constitute an imaging optical system. The type, the number, and the arrangement order of the lenses constituting the imaging optical system of the first lens 12A are not limited to the example shown in FIG. 6.

Further, the first lens 12A has a lens driving control unit 34 and a memory 35. The lens driving control unit 34 is constituted of a CPU, RAM, ROM, and the like. The lens driving control unit 34 is electrically connected to a main control unit 40 in the body 11 through the electric contact 19A and the electric contact 11B.

The lens driving control unit 34 drives the focus lens 31 and the stop 33 on the basis of the control signal transmitted from the main control unit 40. The lens driving control unit 34 performs driving control of the focus lens 31 on the basis of a control signal for focusing control transmitted from the main control unit 40.

The stop 33 has an opening of which an opening diameter is variable about the optical axis OP. The opening diameter of the stop 33 is changed by a user performing a rotational operation of a stop ring (not shown).

The memory 35 is a non-volatile memory such as a flash memory. The memory 35 stores lens information 35A about the optical characteristics of the imaging lens 12. The lens information 35A is information that differs depending on the type of the imaging lens 12. The lens information 35A includes focal length information 35B about the first focal length fx and the second focal length fy described above. The lens information 35A is an example of the storage information according to the technique of the present disclosure.

The configuration of the second lens 12B is the same as that of the first lens 12A except that the cylindrical lens 30 is not provided.

The body 11 is provided with an imaging sensor 20, a main control unit 40, a memory 41, an image processing unit 42, an operating part 43, a display 15, and a finder 17. Operations of the imaging sensor 20, the memory 41, the image processing unit 42, the display 15, and the finder 17 are controlled by the main control unit 40.

The operating part 43 includes the dial 13, the release button 14, and the instruction button 16 (refer to FIGS. 1 and 2) described above. The main control unit 40 controls each unit in the body 11 and the lens driving control unit 34 in the imaging lens 12 in accordance with the operation of the operating part 43.

Figure 7:
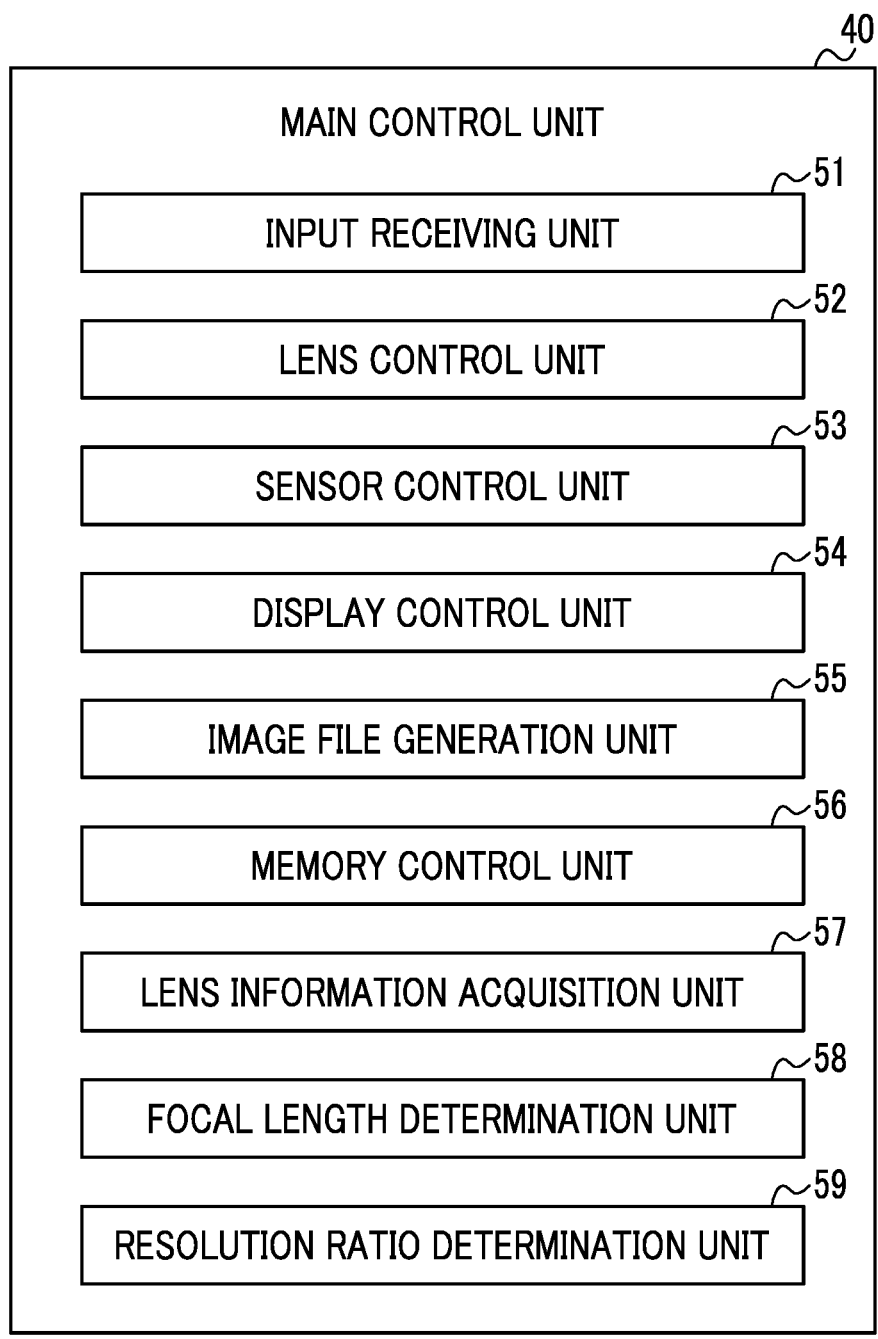
FIG. 7 is a block diagram showing a functional configuration of a main control unit.

The main control unit 40 is composed of a processor such as a CPU. The main control unit 40 implements various functional units by executing processing in accordance with an operation program 41A stored in the memory 41. As shown in FIG. 7, for example, in the main control unit 40, an input receiving unit 51, a lens control unit 52, a sensor control unit 53, a display control unit 54, an image file generation unit 55, a memory control unit 56, a lens information acquisition unit 57, a focal length determination unit 58, and a resolution ratio determination unit 59 are implemented.

The input receiving unit 51 receives various kinds of input information from the operating part 43. The lens control unit 52 performs driving control of the focus lens 31 and the like through the lens driving control unit 34. The sensor control unit 53 performs driving control of the imaging sensor 20. The display control unit 54 controls the display of the image on the display 15 or the EVF of the finder 17. The image file generation unit 55 generates an image file. The memory control unit 56 controls data storage and reading out operations of the memory 41.

The lens information acquisition unit 57 acquires the lens information 35A from the imaging lens 12 attached onto the camera side mount 11A. The focal length determination unit 58 determines a length of the second focal length fy relative to the first focal length fx on the basis of the focal length information 35B included in the lens information 35A acquired by the lens information acquisition unit 57. For example, the focal length determination unit 58 determines whether or not the second focal length fy is longer than the first focal length fx. As a result of the determination, the focal length determination unit 58 determines that, in a case where the second focal length fy is greater than the first focal length fx, the first lens 12A in which the imaging lens 12 attached onto the camera side mount 11A is an anamorphic lens. The focal length determination unit 58 obtains the focal length ratio Rf on the basis of the focal length information 35B, and may determine that the imaging lens 12 attached onto the camera side mount 11A is the first lens 12A in a case where the focal length ratio Rf is greater than 1.

The resolution ratio determination unit 59 determines the resolution ratio Rd to be described later, on the basis of the focal length information 35B included in the lens information 35A acquired by the lens information acquisition unit 57.

Returning to FIG. 6, the imaging sensor 20 is, for example, a CMOS image sensor. The imaging sensor 20 is disposed such that the optical axis OP is orthogonal to the light-receiving surface 20A. Light that has passed through the imaging lens 12 is incident on the light-receiving surface 20A. A plurality of pixels that generate imaging signals by performing photoelectric conversion are formed on the light-receiving surface 20A. The imaging sensor 20 generates an imaging signal constituted of imaging signals of each pixel by photoelectrically converting the light incident on each pixel.

The image processing unit 42 generates a raw image by performing various image processing on the imaging signal which is read out from the imaging sensor 20. The display control unit 54 displays the raw image generated by the image processing unit 42 on the display 15. The image includes a still image and a live view image. The live view image is an image which is displayed in real time on the display 15 by sequentially outputting the raw image, which is generated by the image processing unit 42, to the display 15. In a case where the EVF is selected in the finder 17, the display control unit 54 causes the EVF to display the live view image in real time.

The lens control unit 52 performs focusing control by moving the focus lens 31 through the lens driving control unit 34. The lens control unit 52 moves the focus lens 31 to a position (focusing position) in the image where a sharpness of the focus area is highest. In a case where the imaging sensor 20 is provided with the phase difference pixel, the lens control unit 52 may perform the focusing control on the basis of the detection signal of the phase difference pixel. The lens control unit 52 performs focusing control in response to half-press of the release button 14.

The image file generation unit 55 generates an image file (for example, a RAW image file) on the basis of the raw image generated by the image processing unit 42. The memory control unit 56 stores the image file generated by the image file generation unit 55 in the memory 41 as a storage unit or a storage medium (memory card or the like) that can be attached onto and detached from the body 11. For example, the memory control unit 56 stores the image file in response to the release button 14 being fully pressed. It is preferable that the image file generation unit 55 adds information about the focal length ratio Rf to the raw image which is included in the image file as accessory information.

Further, the lens information acquisition unit 57 acquires the lens information 35A stored in the memory 35 through the lens driving control unit 34 in a case where the imaging lens 12 is connected to the body 11. The focal length determination unit 58 determines whether or not the second focal length fy is longer than the first focal length fx on the basis of the focal length information 35B included in the lens information 35A. The sensor control unit 53 selects a method of reading out an imaging signal from the imaging sensor 20 on the basis of a determination result of the focal length determination unit 58.

Further, in a case where the second focal length fy is longer than the first focal length fx and the imaging lens 12 is the first lens 12A, the sensor control unit 53 performs readout control of the imaging sensor 20 so as to set the resolution ratio Rd of the raw image to a resolution ratio which is determined by the resolution ratio determination unit 59. Specifically, in a case where fy>fx, the sensor control unit 53 sets a resolution ratio Rd of the raw image to be higher than a resolution ratio Rs (refer to FIG. 11) of the imaging sensor 20.

Figure 8:
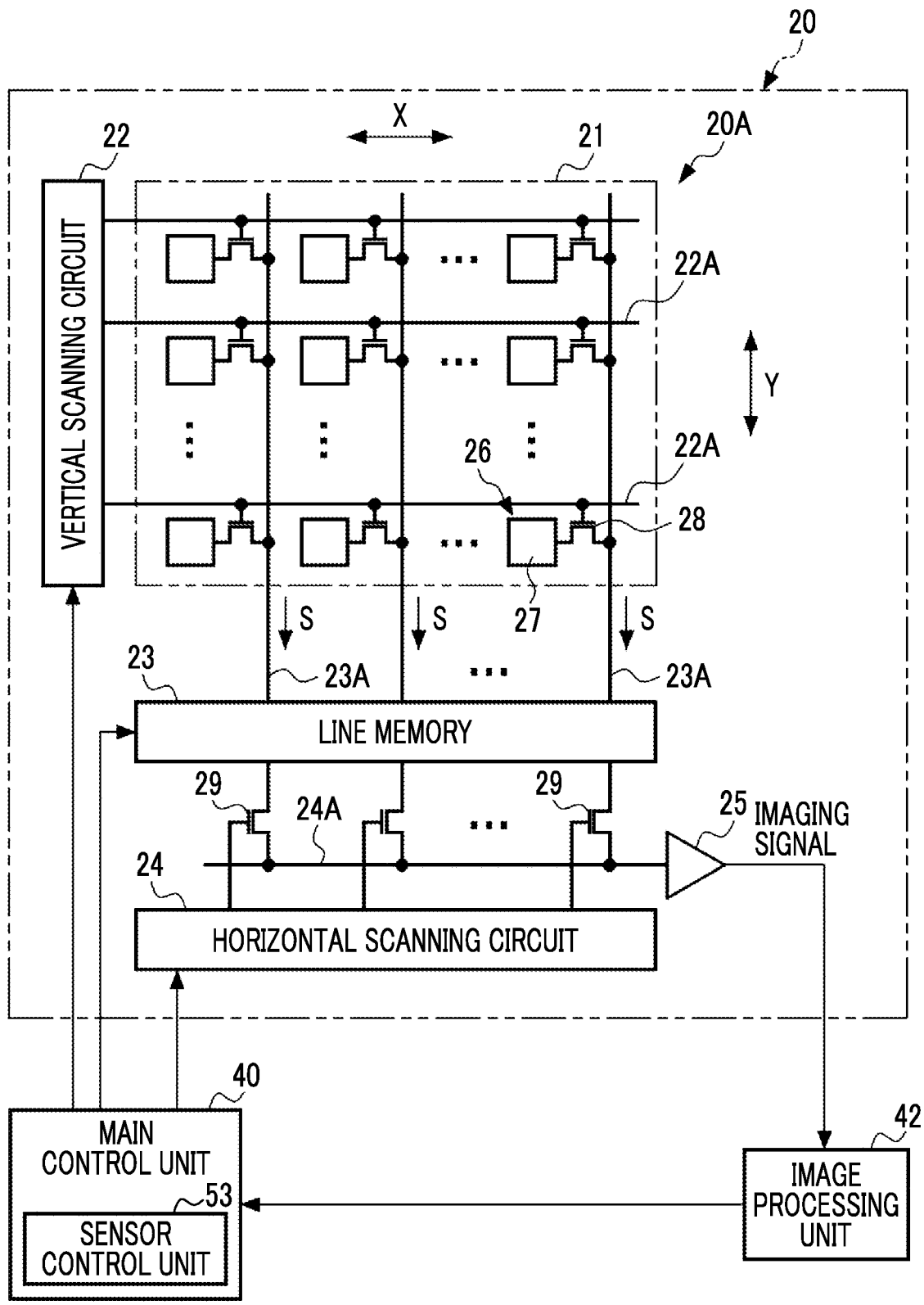
FIG. 8 is a diagram showing a configuration example of an imaging sensor.

FIG. 8 shows an example of a configuration of the imaging sensor 20. The imaging sensor 20 includes a pixel region 21, a vertical scanning circuit 22, a line memory 23, a horizontal scanning circuit 24, and an output amplifier 25. In the pixel region 21, a plurality of pixels 26 are arranged in a two-dimensional matrix along the X direction and the Y direction.

The pixel 26 includes a photoelectric conversion element 27 that converts incident light into a signal charge and stores the signal charge. The photoelectric conversion element 27 is constituted of a photodiode. Further, the pixel 26 includes an amplifier that converts a signal charge into a voltage signal (hereinafter, referred to as an imaging signal), a reset switch, and the like. The pixel 26 outputs an imaging signal S corresponding to an amount of incident light. Further, each pixel 26 is provided with a color filter to be described below. The photoelectric conversion element 27 photoelectrically converts the incident light which is incident through the color filter.

A plurality of gate lines 22A, which extend in the X direction, are connected to the vertical scanning circuit 22. A plurality of signal lines 23A, which extend in the Y direction, are connected to the line memory 23. The plurality of gate lines 22A and the plurality of signal lines 23A intersect with each other in the pixel region 21. Each pixel 26 is provided at a position where the gate line 22A and the signal line 23A intersect with each other. Each pixel 26 is connected to the signal line 23A through a transistor 28 as a switch. The gate electrode of the transistor 28 is connected to the gate line 22A.

The pixels 26 in the pixel region 21 are selected line by line by the selection signal given to the gate line 22A from the vertical scanning circuit 22. In a case where the selection signal is given to the gate line 22A by the vertical scanning circuit 22, the imaging signal S is output from each pixel 26 connected to the gate line 22A to the signal line 23A. Hereinafter, a plurality of pixels 26 arranged in the X direction may be simply referred to as "row".

The line memory 23 stores the imaging signal S output from the pixel 26 for one line. The line memory 23 is constituted of a capacitor or the like. The line memory 23 is connected to the horizontal output line 24A through a transistor 29 as a switch. The output amplifier 25 is connected to the end of the horizontal output line 24A. The horizontal scanning circuit 24 sequentially outputs the imaging signals S for one line stored in the line memory 23 to the horizontal output line 24A by performing horizontal scanning in which the transistors 29 are sequentially selected. The imaging signal S, which is output to the horizontal output line 24A, is output to an external image processing unit 42 through the output amplifier 25.

The sensor control unit 53 controls operations of the vertical scanning circuit 22, the line memory 23, and the horizontal scanning circuit 24. By controlling the vertical scanning circuit 22, the sensor control unit 53 makes it possible to read out the imaging signal S in a "sequential readout mode" or a "pixel thinning-out readout mode". The sequential readout mode is a mode in which the imaging signal S is individually readout from all the pixels 26 by sequentially selecting the gate lines 22A in the Y direction and sequentially selecting the transistors 29 in the X direction.

The pixel thinning-out readout mode is a readout mode in which the resolution is reduced by performing the pixel thinning-out readout in at least one of the X direction or the Y direction in a case where the imaging signal is read out from the imaging sensor 20. The resolution corresponds to the number of pixels per unit length, that is, the pixel density. The "pixel thinning-out readout" in the present disclosure is not limited to the normal "thinning-out readout" in which the pixels 26 to be read out are thinned out, and is a concept including "thinning-out readout performed by addition" in which the number of imaging signals is reduced by adding and reading out the imaging signals of the plurality of pixels 26.

The imaging sensor 20 may include an A/D converter in order to output a digitized imaging signal. The imaging sensor 20 may include a sensor control unit for controlling the vertical scanning circuit 22, the line memory 23, and the horizontal scanning circuit 24.

Figure 9:
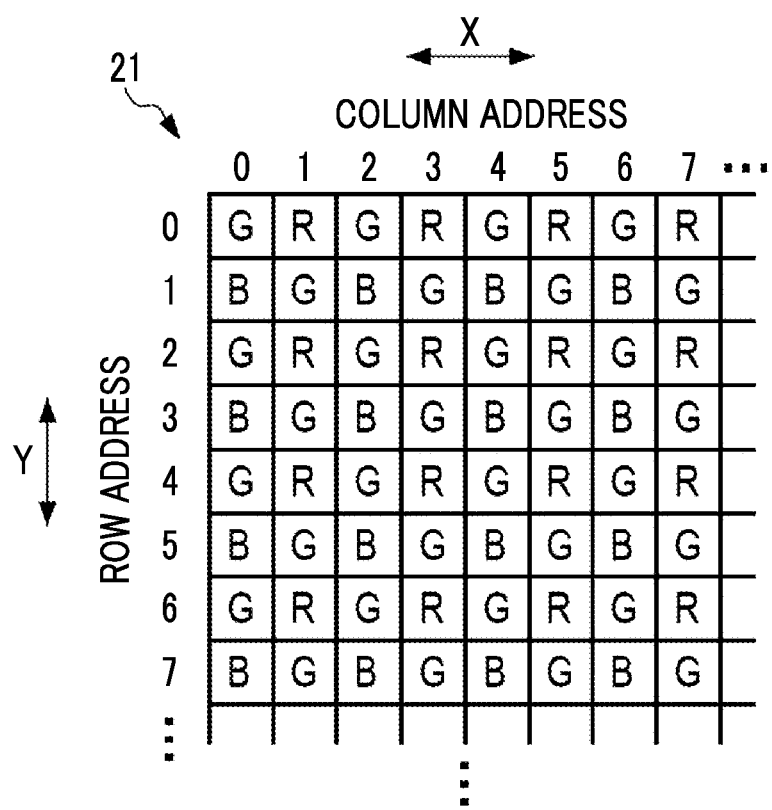
FIG. 9 is a diagram showing types of pixels which are included in a pixel region.

FIG. 9 shows types of pixels 26 (refer to FIG. 8) which are included in the pixel region 21. Reference numerals R, G, and B in FIG. 9 represent colors of the color filters provided in the pixels 26. The R represents red, the G represents green, and the B represents blue. The color array of the color filters shown in FIG. 9 is a so-called Bayer array. The Bayer array is a color array in which a color filter of G is disposed on two diagonal pixels of four pixels of 2×2, and color filters of R and B are disposed on the other two pixels.

The addresses (hereinafter referred to as row addresses) of the gate line 22A (refer to FIG. 8) are, respectively, 0, 1, 2, 3, . . . . The addresses (hereinafter referred to as column addresses) of the signal line 23A (refer to FIG. 8) are, respectively, 0, 1, 2, 3, . . . . The G and R color filters are alternately arranged in the even rows. The B and G color filters are alternately arranged in the odd rows. The G and B color filters are alternately arranged in the even columns. The R and G color filters are alternately arranged in the odd columns.

Hereinafter, the pixel 26 in which the R color filter is disposed is referred to as an R pixel. The pixel 26 in which the G color filter is disposed is referred to as a G pixel. The pixel 26 in which the color filter of B is disposed is referred to as a B pixel.

Figure 10:
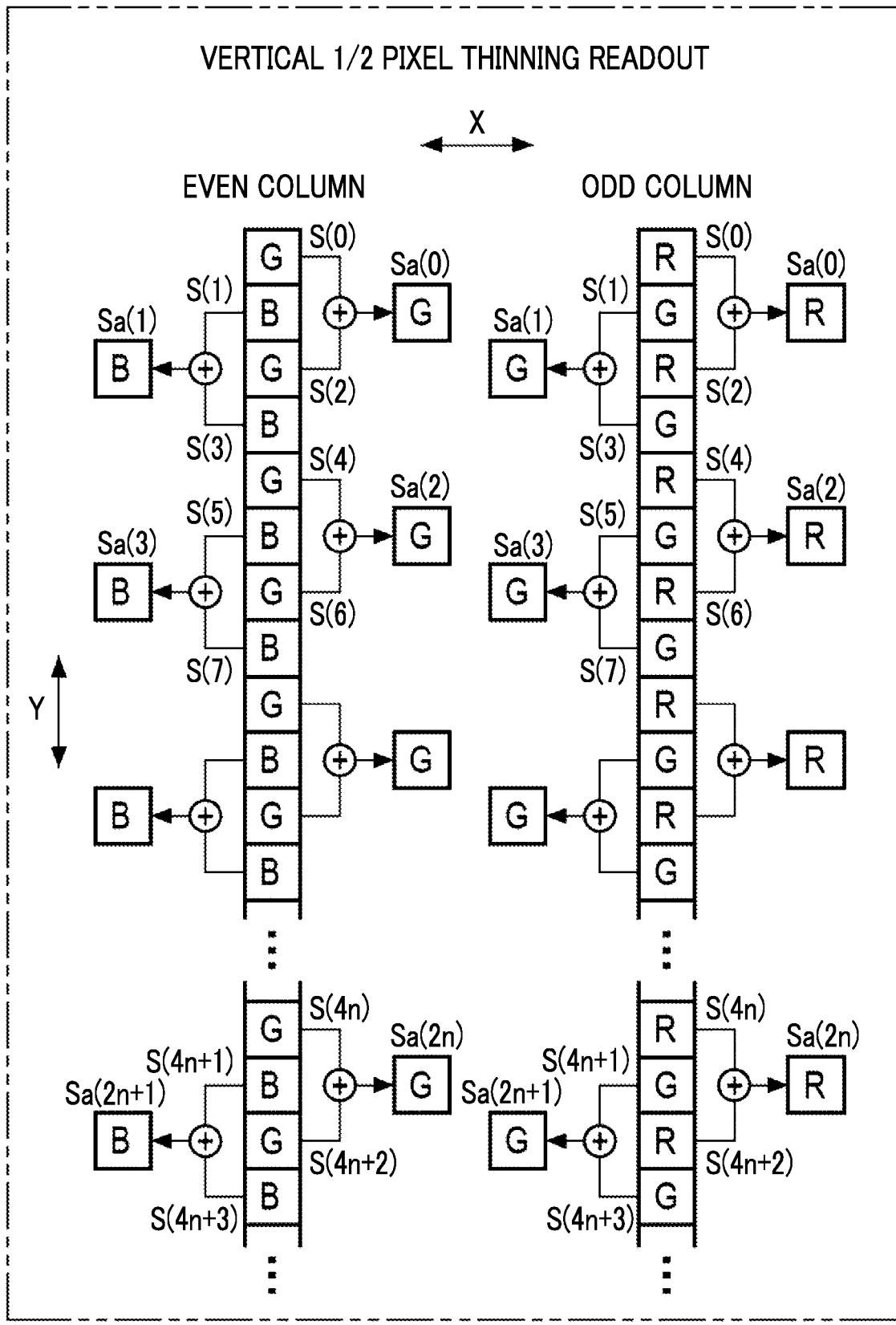
FIG. 10 is a diagram showing an example of vertical 1/2 pixel thinning-out readout.

FIG. 10 shows an example of the pixel thinning-out readout in a case where Rf=2. FIG. 10 shows "vertical 1/2 pixel thinning-out readout" in which the resolution is reduced by a magnification of 1/2 in the Y direction (vertical direction) by the same color pixel addition in which the imaging signals of the same color pixels are added.

Specifically, the vertical scanning circuit 22 simultaneously selects the two gate lines 22A having row addresses "4n" and "4n+2". Therefore, the imaging signals S, which are output to the respective signal lines 23A from the two selected pixels 26, are added. Further, the vertical scanning circuit 22 simultaneously selects the two gate lines 22A having row addresses "4n+1" and "4n+3". Therefore, the imaging signals S, which are output to the respective signal lines 23A from the two selected pixels 26, are added. Here, n=0, 1, 2, 3, . . . .

An addition imaging signal obtained by adding the plurality of imaging signals S is represented by, for example, an arithmetic mean. Therefore, the addition imaging signals Sa(2n) and Sa(2n+1) represented by Expressions (1) and (2) are generated by the above-mentioned vertical 1/2 pixel thinning-out readout and are input to the line memory 23.

$$Sa(2n)=\{S(4n)+S(4n+2)\}/2 \quad (1)$$

$$Sa(2n+1)=\{S(4n+1)+S(4n+3)\}/2 \quad (2)$$

Here, S(n) represents the imaging signal S of the pixel 26 which has the row address n.

As shown in FIG. 10, in the even columns, the addition imaging signal Sa(2n) is a signal obtained by adding and averaging two imaging signals S corresponding to the G pixels, and the addition imaging signal Sa(2n+1) is a signal obtained by adding and averaging the two imaging signals S corresponding to the B pixels. In the odd columns, the addition imaging signal Sa(2n) is a signal obtained by adding and averaging two imaging signals S corresponding to the R pixels, and the addition imaging signal Sa(2n+1) is a signal obtained by adding and averaging the two imaging signals S corresponding to the G pixels. In such a manner, since the two addition imaging signals Sa are output for each of the four imaging signals S, the resolution of the imaging signal is reduced by a magnification of 1/2 in the Y direction.

Figure 11:
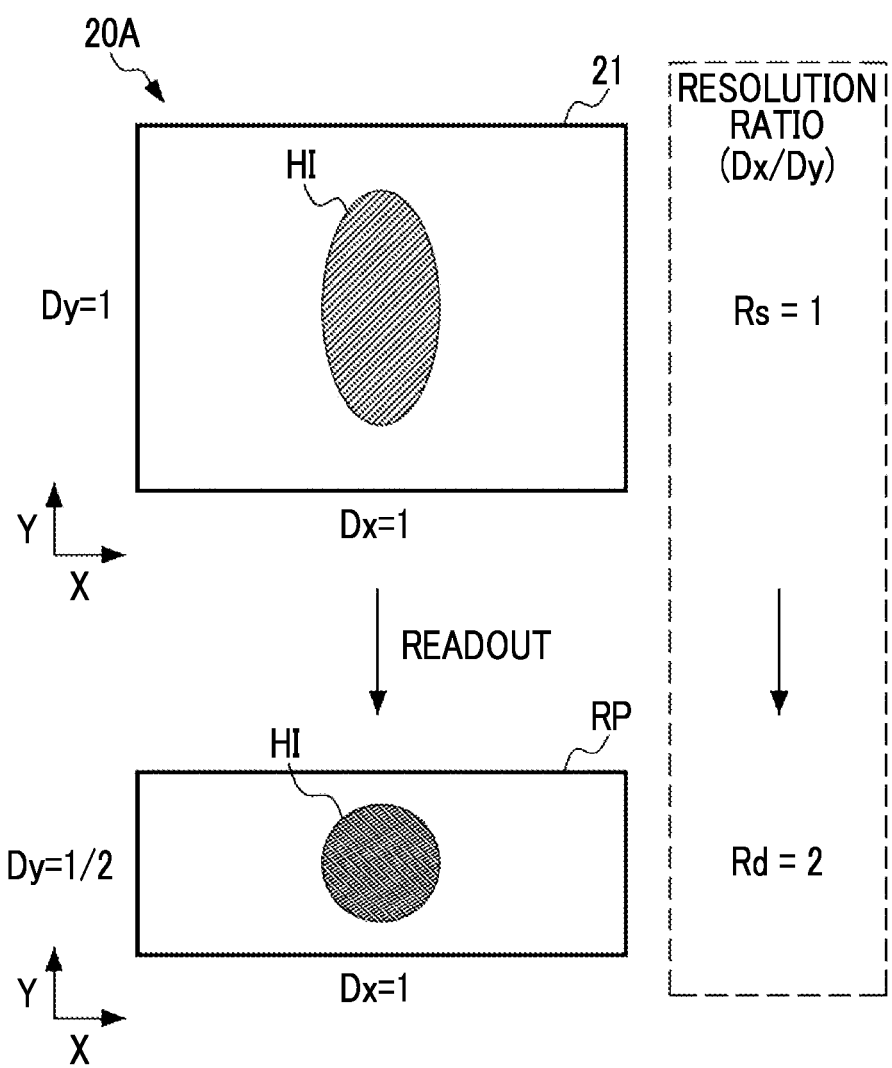
FIG. 11 is a diagram showing change in resolution ratio due to pixel thinning-out readout.

FIG. 11 shows change in resolution ratio due to pixel thinning-out readout. As shown in FIG. 11, in the pixel region 21 of the imaging sensor 20, a resolution Dx in the X direction and a resolution Dy in the Y direction are equal to each other. In a case where a ratio (Dx/Dy) of the resolution Dx to the resolution Dy of the imaging sensor 20 is represented by the resolution ratio Rs, the resolution ratio Rs of the imaging sensor 20 is "1".

The resolution Dy of the imaging signal which is read out from the imaging sensor 20 is reduced by a magnification of 1/2 by the above-mentioned vertical 1/2 pixel thinning-out readout. Therefore, the resolution ratio Rd of the raw image RP generated on the basis of the imaging signal which is read out from the imaging sensor 20 is "2".

The resolution ratio Rd of the raw image RP is twice the resolution ratio Rs of the imaging sensor 20. Therefore, the subject image HI compressed in the X direction by the first lens 12A is stretched in the X direction and is returned to a shape of the original subject H (Refer to FIG. 5). Thereby, an image having a wide angle of view in the horizontal direction, for example, a cinemascope size image can be obtained.

The resolution ratio determination unit 59 (refer to FIG. 7) determines the resolution ratio Rd of the raw image RP on the basis of the focal length information 35B. Specifically, the resolution ratio determination unit 59 matches the resolution ratio Rd of the raw image RP with the focal length ratio Rf. For example, the resolution ratio determination unit 59 sets such that Rd=2 in a case where Rf=2. Therefore, in a case where the first lens 12A having the relationship of "Rf=2" is attached onto the body 11, the imaging sensor 20 reads out the imaging signal from the imaging sensor 20 by the above-mentioned vertical 1/2 pixel thinning-out readout.

Figure 12:
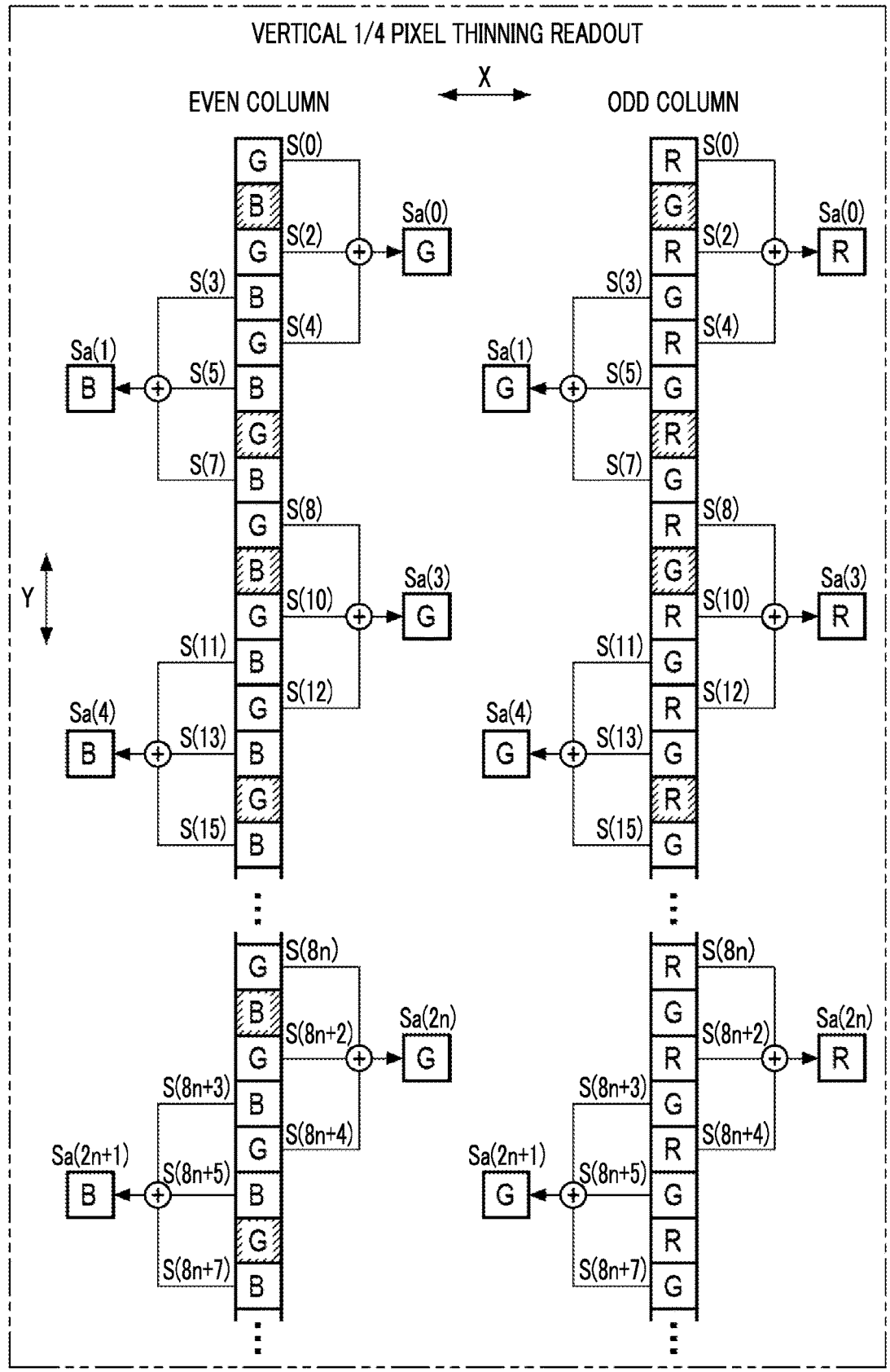
FIG. 12 is a diagram showing an example of vertical 1/4 pixel thinning-out readout.
Figure 13:
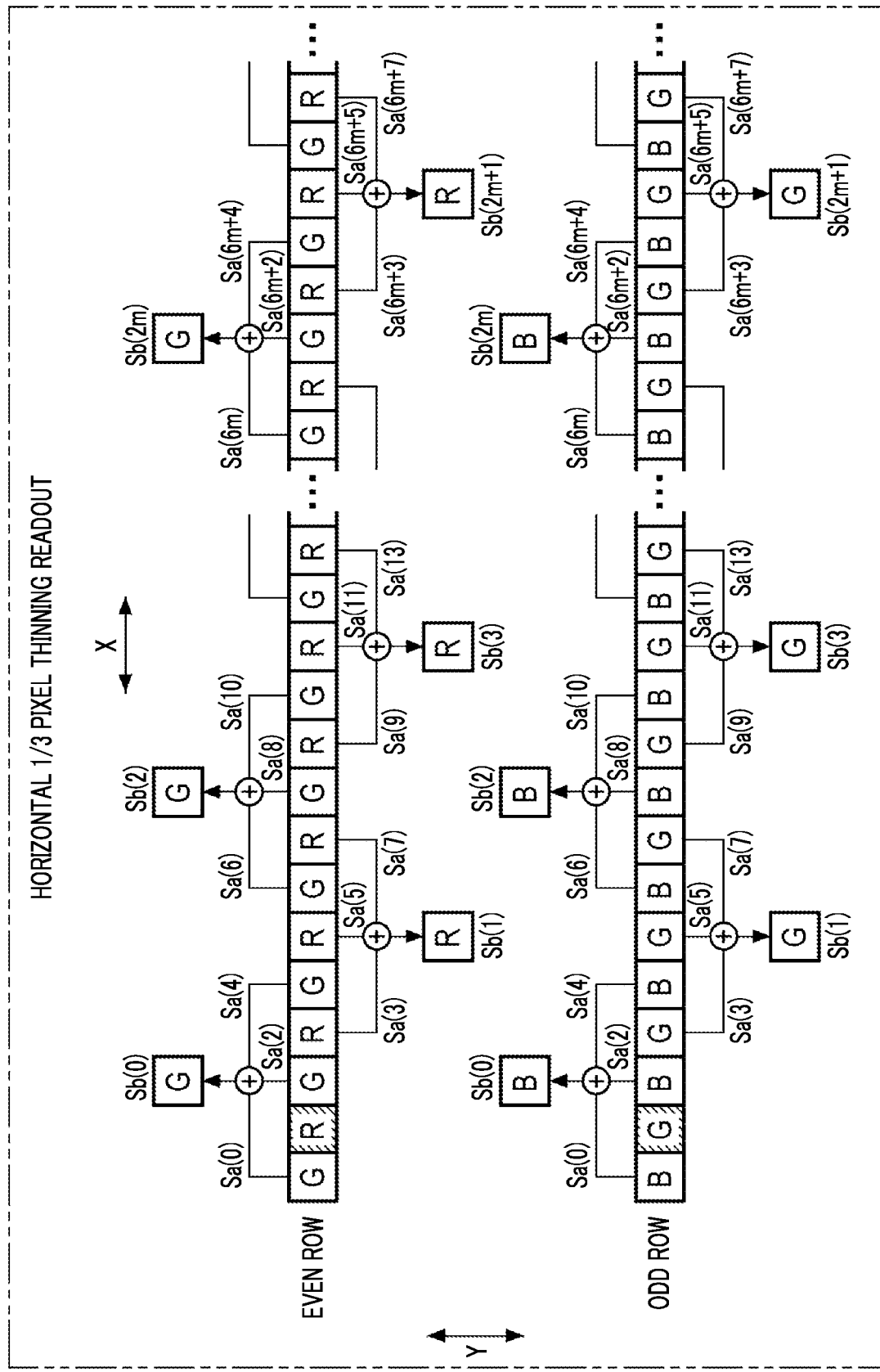
FIG. 13 is a diagram showing an example of horizontal 1/3 pixel thinning-out readout.

FIG. 12 and FIG. 13 show an example of pixel thinning-out readout in a case where Rf=4/3. FIG. 12 shows "vertical 1/4 pixel thinning-out readout" in which the resolution is reduced by a magnification of 1/4 in the Y direction by adding pixels having the same color. FIG. 13 shows "horizontal 1/3 pixel thinning-out readout" in which the resolution is reduced by a magnification of 1/3 in the X direction by adding pixels having the same color.

In a case where Rf=4/3, the sensor control unit 53 sets the resolution ratio Rd to 4/3 by combining the "vertical 1/4 pixel thinning-out readout" and the "horizontal 1/3 pixel thinning-out readout" in reading out the imaging signal from the imaging sensor 20.

As described above, in a case where Rf=4/3, in addition to the "vertical pixel thinning-out readout" that reduces the resolution in the Y direction, the "horizontal pixel thinning-out readout" that reduces the resolution in the X direction is performed. The vertical pixel thinning-out readout is executed by the vertical scanning circuit 22 simultaneously selecting a plurality of gate lines 22A (refer to FIG. 8), as described above. The horizontal pixel thinning-out readout is executed by the horizontal scanning circuit 24 simultaneously turning on a plurality of transistors 29 (refer to FIG. 8). In a case where the plurality of transistors 29 are turned on simultaneously, the plurality of imaging signals stored in the line memory 23 are simultaneously output to the horizontal output line 24A to be added. In addition, the present disclosure is not limited to the case where Rf=4/3, and a configuration may be made such that, in addition to the "vertical pixel thinning-out readout" that reduces the resolution in the Y direction according to the value of Rf, the "horizontal pixel thinning-out readout" that reduces the resolution in the X direction is performed.

The "vertical 1/4 pixel thinning-out readout" shown in FIG. 12 will be specifically described. In the vertical 1/4 pixel thinning-out readout, the vertical scanning circuit 22 simultaneously selects the gate lines 22A having row addresses "8n", "8n+2", and "8n+4". Therefore, the imaging signals S, which are output to the respective signal lines 23A from the three selected pixels 26, are added. Further, the vertical scanning circuit 22 simultaneously selects the gate lines 22A having row addresses "8n+3", "8n+5", and "8n+7". Therefore, the imaging signals S, which are output to the respective signal lines 23A from the three selected pixels 26, are added.

An addition imaging signal obtained by adding the plurality of imaging signals S is represented by, for example, an arithmetic mean. Therefore, the addition imaging signals Sa(2n) and Sa(2n+1) represented by Expressions (3) and (4) are generated by the above-mentioned vertical 1/4 pixel thinning-out readout and are input to the line memory 23.

$$Sa(2n)=\{S(8n)+S(8n+2)+S(8n+4)\}/3 \quad (3)$$

$$Sa(2n+1)=\{S(8n+3)+S(8n+5)+S(8n+7)\}/3 \quad (4)$$

Here, S(n) represents the imaging signal S of the pixel 26 which has the row address n.

As shown in FIG. 12, in the even columns, the addition imaging signal Sa(2n) is a signal obtained by adding and averaging three imaging signals S corresponding to the G pixels, and the addition imaging signal Sa(2n+1) is a signal obtained by adding and averaging the three imaging signals S corresponding to the B pixels. In the odd columns, the addition imaging signal Sa(2n) is a signal obtained by adding and averaging three imaging signals S corresponding to the R pixels, and the addition imaging signal Sa(2n+1) is a signal obtained by adding and averaging the three imaging signals S corresponding to the G pixels. In such a manner, since the two addition imaging signals Sa are output for each of the eight imaging signals S, the resolution of the imaging signal is reduced by a magnification of 1/4 in the Y direction.

It should be noted that, in FIG. 12, the imaging signal is not read out for the hatched pixels at the row addresses "8n+1" and "8n+6".

The "horizontal 1/3 pixel thinning-out readout" shown in FIG. 13 will be specifically described. In the horizontal 1/3 pixel thinning-out readout, the horizontal scanning circuit 24 simultaneously turns on the transistors 29 having column addresses "6m", "6m+2", and "6m+4". Then, the horizontal scanning circuit 24 adds the three addition imaging signals Sa which are output by "vertical 1/4 pixel thinning-out readout" in FIG. 12 and stored in the line memory 23 corresponding to the selected column address. Further, the horizontal scanning circuit 24 simultaneously turns on the transistors 29 having the column addresses "6m+3", "6m+5", and "6m+7", thereby adding three addition imaging signals Sa stored in the line memory 23 corresponding to the selected column address. Here, m=0, 1, 2, 3, . . . .

The addition imaging signal obtained by adding the plurality of addition imaging signals Sa "thinned vertically 1/4 pixels" is represented by, for example, the arithmetic mean. Therefore, the addition imaging signals Sb(2n) and Sb(2n+1) represented by Expressions (5) and (6) are generated by the above-mentioned horizontal 1/3 pixel thinning-out readout.

$$Sb(2m)=\{Sa(6m)+Sa(6m+2)+Sa(6m+4)\}/3 \quad (5)$$

$$Sb(2m+1)=\{Sa(6m+3)+Sa(6m+5)+Sa(6m+7)\}/3 \quad (6)$$

Here, Sa(m) represents the addition imaging signal Sa of which the column address is m, which is generated by the vertical 1/4 pixel thinning-out readout and is input to the line memory 23.

As shown in FIG. 13, in the even rows, the addition imaging signal Sb(2m) is a signal obtained by adding and averaging three addition imaging signals Sa corresponding to the G pixels, and the addition imaging signal Sb(2m+1) is a signal obtained by adding and averaging the three addition imaging signals Sa corresponding to the R pixels. In the odd rows, the addition imaging signal Sb(2m) is a signal obtained by adding and averaging three addition imaging signals Sa corresponding to the B pixels, and the addition imaging signal Sb(2m+1) is a signal obtained by adding and averaging the three addition imaging signals Sa corresponding to the G pixels. In such a manner, since the two addition imaging signals Sb are output for the six addition imaging signals Sa, the resolution of the imaging signal is reduced to a magnification of 1/3 in the X direction.

In such a manner, by combining the vertical 1/4 pixel thinning-out readout and the horizontal 1/3 pixel thinning-out readout, the resolution of the imaging signal is reduced by a magnification of 1/4 in the Y direction and is reduced to a magnification of 1/3 in the X direction. Thereby, the resolution ratio Rd is 4/3.

Figure 14:
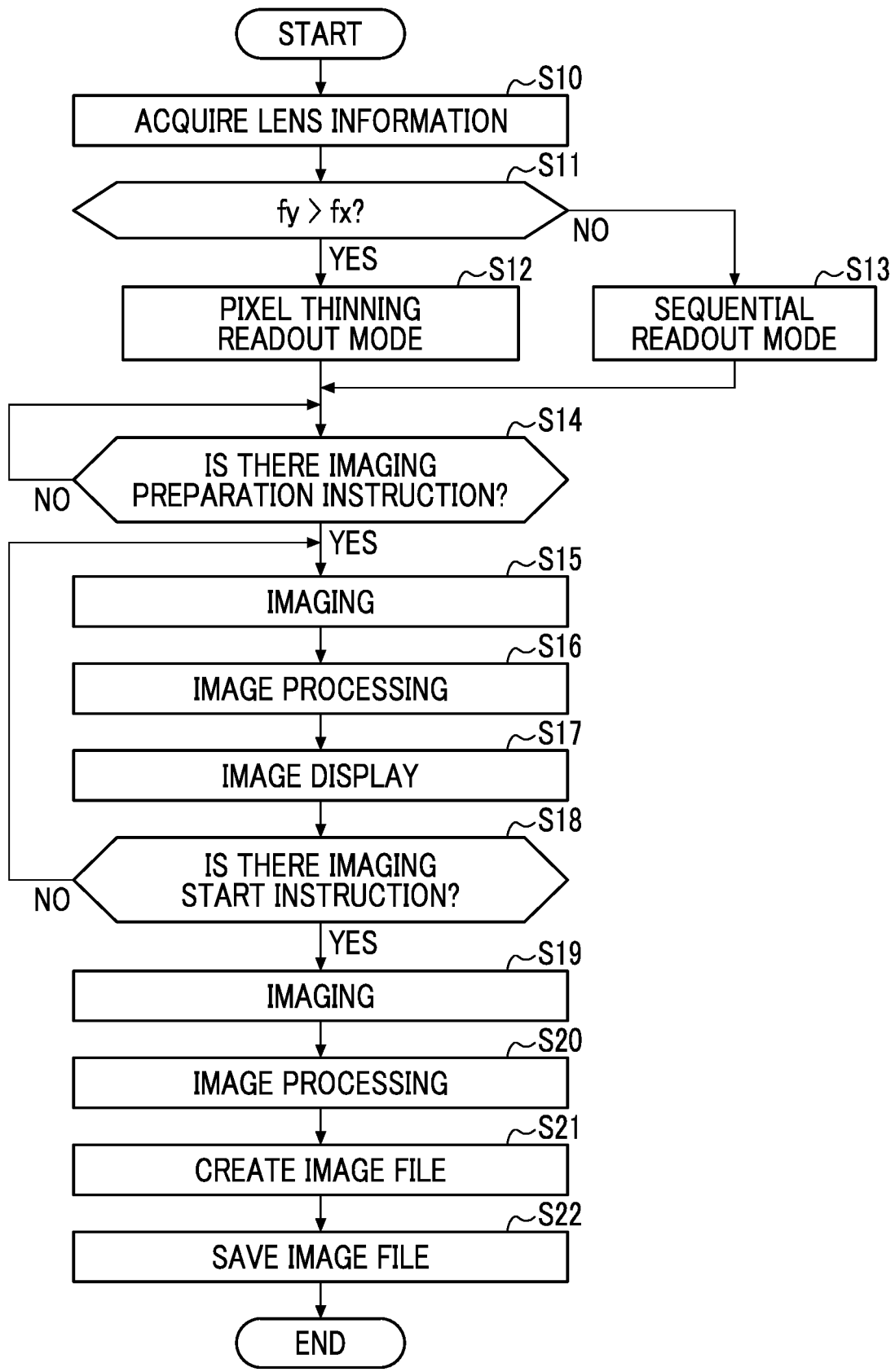
FIG. 14 is a flowchart showing operations of the imaging apparatus.

Next, an operation of the imaging apparatus 10 will be described. FIG. 14 is a flowchart showing an example of a flow of processing which is executed by the main control unit 40 (refer to FIGS. 6 and 7).

First, in step S10, the lens information acquisition unit 57 acquires the lens information 35A (refer to FIG. 6) from the imaging lens 12 mounted on the body 11. For example, the lens information acquisition unit 57 acquires the lens information 35A in a case where the power switch (not shown) is turned on in a state where the imaging lens 12 is mounted on the body 11.

In step S11, the focal length determination unit 58 determines a length of the second focal length fy relative to the first focal length fx on the basis of the focal length information 35B included in the lens information 35A. In a case where the focal length determination unit 58 determines that the second focal length fy is longer than the first focal length fx (step S11: YES), the processing proceeds to step S12. On the other hand, in a case where the focal length determination unit 58 determines that the second focal length fy is equal to the first focal length fx (step S11: NO), the processing proceeds to step S13.

In step S12, the sensor control unit 53 selects the "pixel thinning-out readout mode" as the readout method for the imaging signal from the imaging sensor 20. On the other hand, in step S13, the sensor control unit 53 selects the "sequential readout mode" as the readout method for the imaging signal from the imaging sensor 20. In step S12, the resolution ratio determination unit 59 determines the resolution ratio Rd of the raw image on the basis of the focal length information 35B. After step S12 or step S13, the processing proceeds to step S14.

In step S14, the input receiving unit 51 determines whether or not an imaging preparation instruction is issued by the user operating the operating part 43 (refer to FIG. 6). For example, the user operating the dial 13 (refer to FIG. 1) to select the still image capturing mode corresponds to the imaging preparation instruction. In a case where the input receiving unit 51 determines that the imaging preparation instruction is issued (step S14: YES), the processing proceeds to step S15.

In step S15, the sensor control unit 53 causes the imaging sensor 20 to perform an imaging operation on the basis of the readout mode selected in step S12 or step S13. Specifically, in a case where the pixel thinning-out readout mode is selected, the sensor control unit 53 causes the imaging sensor 20 to read out the imaging signal by pixel thinning-out readout corresponding to the focal length ratio Rf. For example, in a case where Rf=2, the sensor control unit 53 reads out the imaging signal by the vertical 1/2 pixel thinning-out readout shown in FIG. 10. On the other hand, in a case where Rf=4/3, the sensor control unit 53 reads out the imaging signal by performing the vertical 1/4 pixel thinning-out readout shown in FIG. 12 and the horizontal 1/3 pixel thinning-out readout shown in FIG. 13.

In a case where the sequential readout mode is selected, the sensor control unit 53 causes the imaging sensor 20 to read out the imaging signal by sequential readout.

In step S16, the image processing unit 42 performs image processing. The image processing unit 42 performs image processing on the imaging signal which is read out from the imaging sensor 20 so as to generate a raw image. In step S17, the display control unit 54 displays the raw image generated by the image processing unit 42 on the display 15 or the EVF of the finder 17.

In step S18, the input receiving unit 51 determines whether or not an imaging start instruction is issued by the user operating the operating part 43. For example, a case where the user presses the release button 14 halfway and then fully presses the release button 14 corresponds to the imaging start instruction. In a case where the main control unit 40 determines that the imaging start instruction is not received (step S18: NO), the processing returns to step S15. The main control unit 40 determines that the imaging start instruction is received (step S18: YES), the processing proceeds to step S19. That is, the processing from step S15 to step S17 is repeatedly executed until the imaging start instruction is issued. Thereby, the live view image is displayed on the display 15 or the EVF of the finder 17.

In step S19, the sensor control unit 53 causes the imaging sensor 20 to perform the imaging operation on the basis of the readout mode selected in step S12 or step S13, as in step S15. In step S20, the image processing unit 42 performs the same image processing as in step S16. In step S21, the image file generation unit 55 generates an image file on the basis of the raw image generated by the image processing unit 42. In such a case, it is preferable that the image file generation unit 55 generates the image file by adding the focal length information 35B to the accessory information of the raw image.

In step S22, the memory control unit 56 stores the image file generated in step S21 in the memory 41 or a storage medium. Then, a sequence of processing ends.

The raw image included in the image file stored in the memory 41 or the storage medium may be an image that is not subjected to image processing by the image processing unit 42. It is preferable that the format of the image file can be selected by the user using the operating part 43.

As described above, in a case where the second focal length fy of the imaging lens 12 attached onto the body 11 is longer than the first focal length fx, the resolution ratio Rd of the raw image generated by reading out the imaging signal is set to be higher than the resolution ratio Rs of the imaging sensor 20. In such a manner, since the resolution ratio is converted in a case where the imaging signal is read out from the imaging sensor 20, it is not necessary for the image processing unit 42 to perform post-processing such as resolution conversion. Therefore, according to the present embodiment, an image (for example, a cinemascope size image) corresponding to the first lens 12A can be obtained without performing post-processing.

Second Embodiment

Next, an imaging apparatus according to a second embodiment of the present invention will be described. In the present embodiment, in a case where RF=4/3, the sensor control unit 53 performs the vertical 1/4 pixel thinning-out readout shown in FIG. 15 instead of the vertical 1/4 pixel thinning-out readout shown in FIG. 12.

Figure 15:
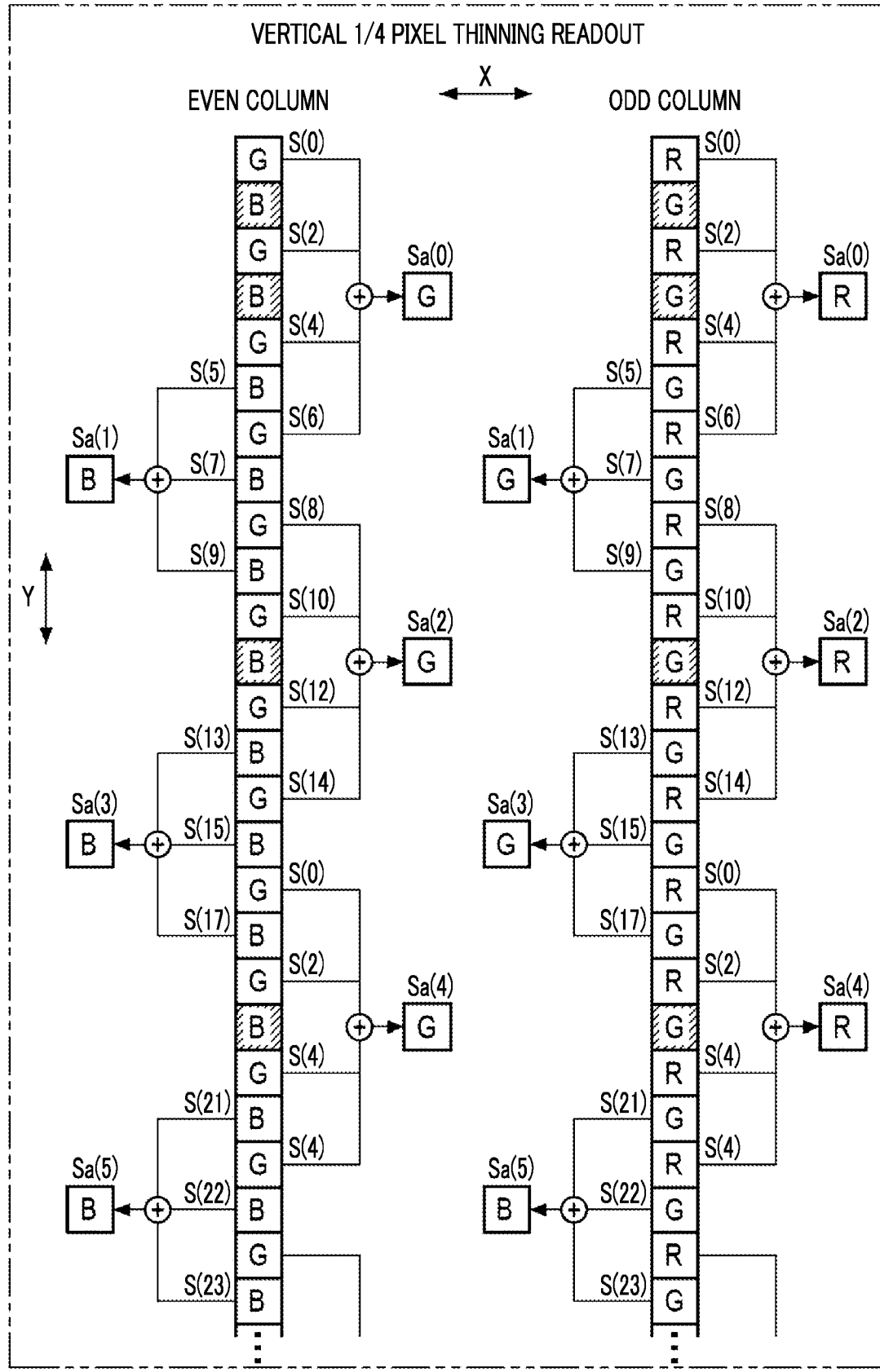
FIG. 15 is a diagram showing a vertical 1/4 pixel thinning-out readout according to a second embodiment.

The "vertical 1/4 pixel thinning-out readout" shown in FIG. 15 will be specifically described. In the vertical 1/4 pixel thinning-out readout of the present embodiment, the vertical scanning circuit 22 simultaneously selects the gate line 22A which has the row addresses "8n", "8n+2", "8n+4", and "8n+6". Then, the sensor control unit 53 adds the imaging signals S which are output to the respective signal lines 23A from the four selected pixels 26. Further, the vertical scanning circuit 22 simultaneously selects the gate lines 22A which have the row addresses "8n+5", "8n+7", and "8n+9". Therefore, the imaging signals S, which are output to the respective signal lines 23A from the three selected pixels 26, are added.

An addition imaging signal obtained by adding the plurality of imaging signals S is represented by, for example, an arithmetic mean. Therefore, the addition imaging signals Sa(2n) and Sa(2n+1) represented by Expressions (7) and (8) are generated by the vertical 1/4 pixel thinning-out readout of the present embodiment and are input to the line memory 23.

$$Sa(2n)=\{S(8n)+S(8n+2)+S(8n+4)+S(8n+6)\}/4 \quad (7)$$

$$Sa(2n+1)=\{S(8n+5)+S(8n+7)+S(8n+9)\}/3 \quad (8)$$

Here, S(n) represents the imaging signal S of the pixel 26 which has the row address n.

As shown in FIG. 15, in the even columns, the addition imaging signal Sa(2n) is a signal obtained by adding and averaging four imaging signals S corresponding to the G pixels, and the addition imaging signal Sa(2n+1) is a signal obtained by adding and averaging the two imaging signals S corresponding to the B pixels. In the odd columns, the addition imaging signal Sa(2n) is a signal obtained by adding and averaging two imaging signals S corresponding to the R pixels, and the addition imaging signal Sa(2n+1) is a signal obtained by adding and averaging the two imaging signals S corresponding to the G pixels. In such a manner, since the two addition imaging signals Sa are output for each of the eight imaging signals S, the resolution of the imaging signal is reduced by a magnification of 1/4 in the Y direction.

As shown in FIG. 15, in the vertical 1/4 pixel thinning-out readout of the present embodiment, the bias of the color centroid of the addition pixel is reduced as compared with the vertical 1/4 pixel thinning-out readout shown in FIG. 12. Specifically, in the even column, the color centroids of the B addition pixels are located at the center of the color centroids of the two G addition pixels, and the color centroids of the G addition pixels are located at the center of the color centroids of the two B addition pixels. Further, in the odd column, the color centroid of the G addition pixel is located at the center of the color centroids of the two R addition pixels, and the color centroid of the R addition pixel is located at the center of the color centroids of the two G addition pixels.

Other configurations and control of the imaging apparatus according to the second embodiment are the same as those of the imaging apparatus 10 according to the first embodiment.

Third Embodiment

Next, an imaging apparatus according to a third embodiment of the present invention will be described. In the present embodiment, an aspect ratio, which is the length of the display 15 in the X direction with respect to the length in the Y direction, is different from the focal length ratio Rf of the first lens 12A. Further, the display control unit 54 can selectively execute the first display mode and the second display mode as the mode in which the image is displayed on the display 15 or the EVF of the finder 17.

The first display mode is a mode in which the main control unit 40 displays the imaging signal which is read out from the imaging sensor 20 as the first image in a state where the aspect ratio is maintained. The second display mode is a mode in which the main control unit 40 displays the imaging signal which is read out from the imaging sensor 20 as a second image by converting the aspect ratio on the basis of the focal length ratio Rf. An aspect ratio of the first image is greater than an aspect ratio of the second image. In other words, the second image is an image in which the aspect ratio of the imaging signal subjected to the thinning-out processing on the basis of the focal length ratio Rf in the imaging sensor 20 is converted again by the main control unit 40 on the basis of the focal length ratio Rf.

Figure 16:
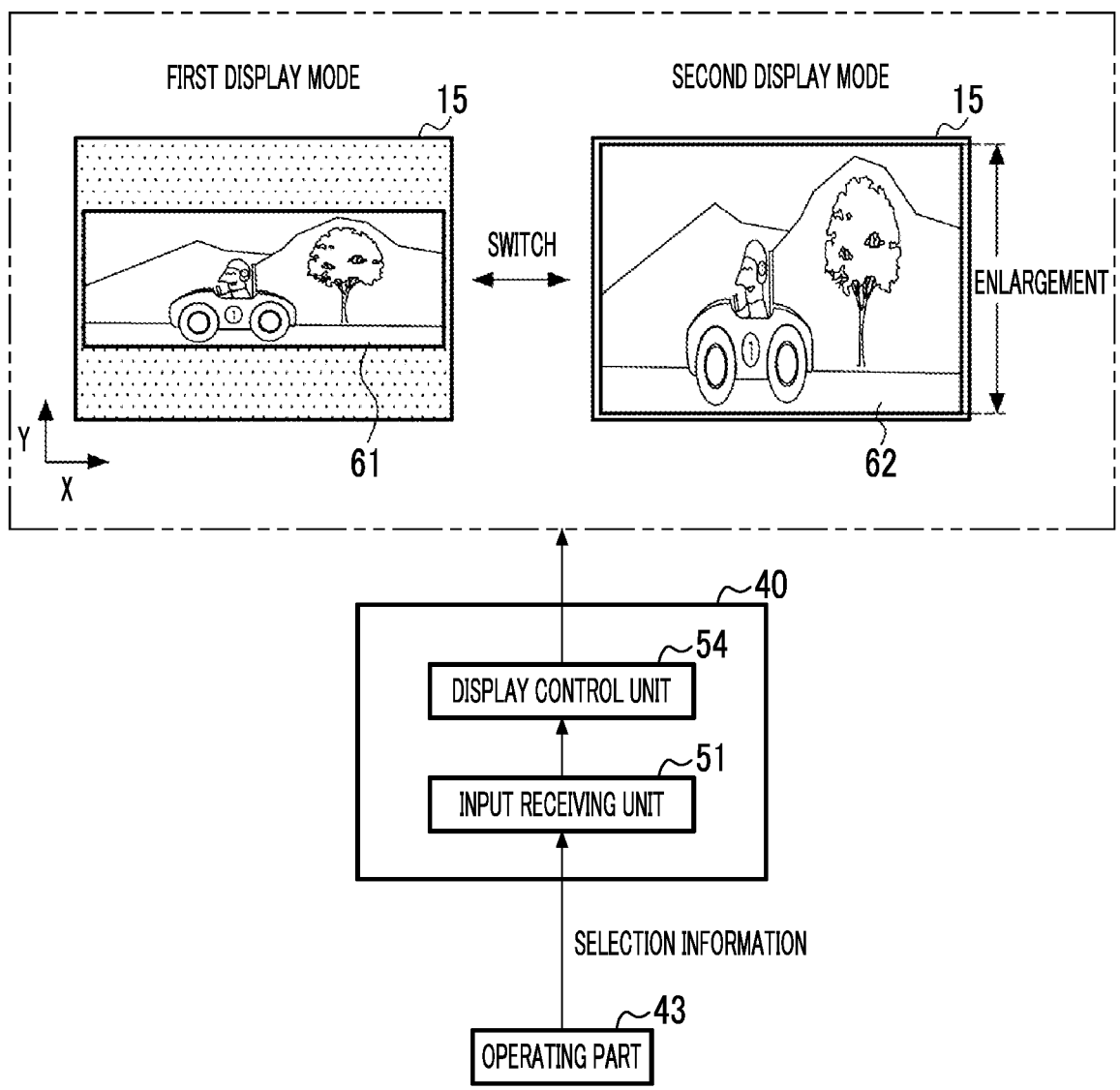
FIG. 16 is a diagram showing an example of a first display mode and a second display mode according to a third embodiment.

FIG. 16 shows examples of the first display mode and the second display mode. FIG. 16 shows an example in which the display control unit 54 selectively displays the first image 61 and the second image 62 on the display 15. Further, FIG. 16 shows a display example of the first image 61 and the second image 62 in a case where the first lens 12A having a relationship of "Rf=2" is attached onto the body 11. For example, the first image 61 and the second image 62 are live view images.

In the present embodiment, the input receiving unit 51 receives user's selection information about the first display mode, the second display mode, and the selection from the operating part 43. For example, a user is able to select either the first display mode or the second display mode by operating the dial 13 (refer to FIG. 1) included in the operating part 43. The display control unit 54 executes the first display mode or the second display mode on the basis of the selection information received by the input receiving unit 51.

The resolution of the first image 61 displayed on the display 15 in the first display mode is an image of which the resolution is changed such that "Rd=2" on the basis of the focal length ratio Rf in a case of reading out the imaging signal from the imaging sensor 20. The first image 61 is an image corresponding to the raw image RP shown in FIG. 11. In the first display mode, an aspect ratio of the display 15 is a value greater than the aspect ratio of the first image. Therefore, in the display 15, a large number of non-display regions of the first image 61 are present.

The second image 62 displayed on the display 15 in the second display mode is an image in which the resolution of the first image 61 is changed to match the aspect ratio of the display 15 on the basis of the focal length ratio Rf again. The second image 62 is an image corresponding to an optical image which is formed on the light-receiving surface 20A shown in FIG. 11. The display control unit 54 generates the second image 62 by enlarging the first image 61 in the Y direction by, for example, pixel complementation processing.

The first image 61 which is displayed in the first display mode is an image corresponding to the first lens 12A and has a large aspect ratio. Therefore, the subject in the image may be small and it may be difficult to visually recognize the subject. On the other hand, the aspect ratio of the second image 62 is closer to the aspect ratio of the display 15 than an aspect ratio of the first image 61. In such a case, a user is able to confirm the subject by the second image 62 having a large image size by operating the operating part 43 to switch the display mode to the second display mode.

In a case where the aspect ratio of the screen of the display 15 is substantially the same as the aspect ratio of the light-receiving surface 20A of the imaging sensor 20, the second image 62 is displayed on substantially the entire screen of the display 15. As a result, the visibility of the image is improved.

In addition, it is preferable that the memory control unit 56 stores the raw image, which is generated on the basis of the imaging signal which is read out from the imaging sensor by the sensor control unit 53, in the memory 41 or a storage medium in a state where the aspect ratio is maintained, regardless of the selection of the first display mode or the second display mode.

Other configurations and control of the imaging apparatus according to the third embodiment are the same as those of the imaging apparatus 10 according to the first embodiment.

Fourth Embodiment

Next, an imaging apparatus according to a fourth embodiment of the present invention will be described. In the present embodiment, the display control unit 54 is able to execute the enlarged display mode as a mode in which the image is displayed on the display 15 or the EVF of the finder 17 in a case where a user confirms the focus of the subject. Further, in the present embodiment, the display control unit 54 is able to selectively execute the enlarged display mode in addition to the first display mode and the second display mode of the third embodiment.

Figure 17:
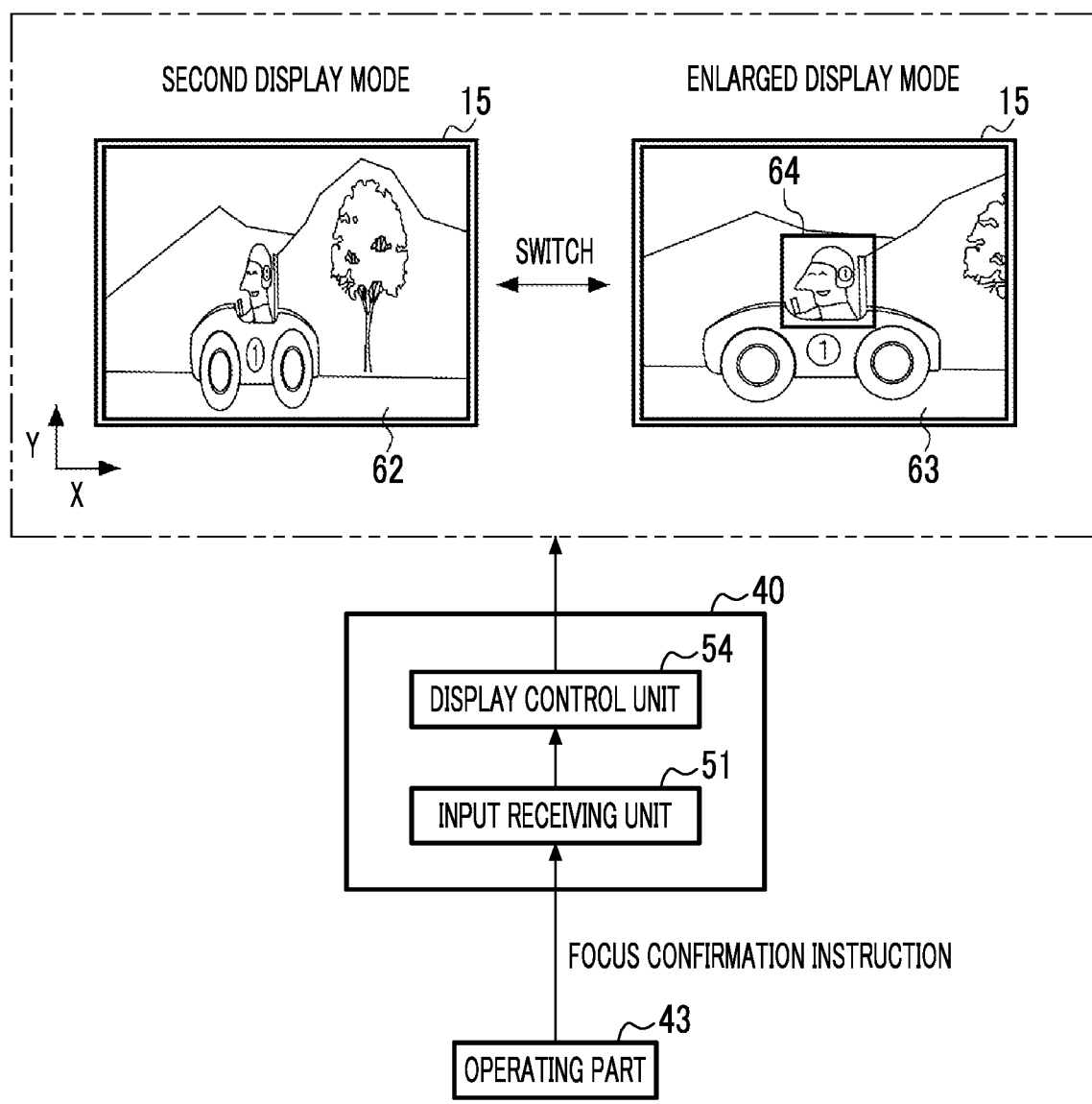
FIG. 17 is a diagram showing an example of an enlarged display mode according to a fourth embodiment.

FIG. 17 shows an example of the enlarged display mode. The enlarged display mode is a mode for displaying a third image 63 enlarged in a state where the aspect ratio is maintained of the first image 61 (refer to FIG. 16) described in the third embodiment. The first image 61 is an image in which the imaging signal which is read out from the imaging sensor 20 is displayed in a state where the aspect ratio is maintained.

For example, the display control unit 54 generates the third image 63 by enlarging the first image 61 such that the focus area 64, which is a target region of focus, is located at the center. Even in a case where the second display mode described in the third embodiment is selected, the display control unit 54 enlarges the first image 61 and displays the first image 61 on the display 15 in a case where the enlarged display mode is selected.

In the present embodiment, the input receiving unit 51 receives a user's focusing confirmation instruction for confirmation of the focusing state from the operating part 43. For example, a user is able to issue a focusing confirmation instruction by operating the instruction button 16 (refer to FIG. 1) included in the operating part 43. The display control unit 54 executes the enlarged display mode in response to the focusing confirmation instruction which is received by the input receiving unit 51. It should be noted that the focus is not limited to the release button 14, and a configuration may be made such that the focusing confirmation instruction can be issued by other operation buttons or the like.

Since the second image 62 displayed in the second display mode is an image compressed in the X direction, it may be difficult to confirm the focusing state of the subject. In the present embodiment, since the user operates the operating part 43 to issue the focusing confirmation instruction, the first image 61 stretched in the X direction is enlarged and displayed. Therefore, the focusing state of the subject can be more accurately confirmed.

Other configurations and control of the imaging apparatus according to the fourth embodiment are the same as those of the imaging apparatus 10 according to the third embodiment.

Fifth Embodiment

Next, an imaging apparatus according to a fifth embodiment of the present invention will be described. The imaging apparatus according to the present embodiment includes an optical filter (that is, a low-pass filter) which separates a plurality of rays incident from the imaging lens 12. This optical filter suppresses occurrence of false signals (for example, false colors).

Figure 18:
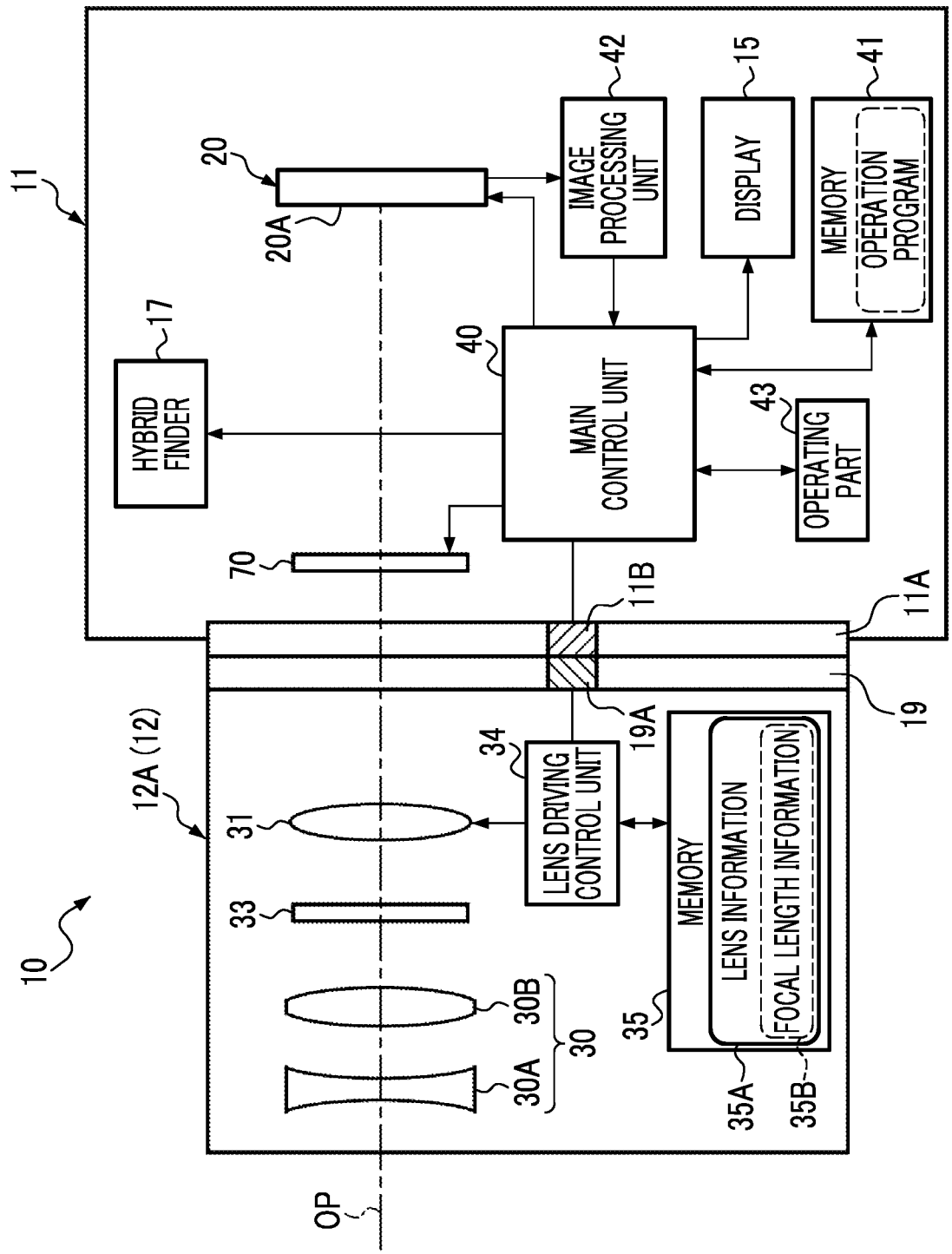
FIG. 18 is a diagram showing an internal configuration of the imaging apparatus according to a fifth embodiment.

FIG. 18 shows an internal configuration of the imaging apparatus 10A according to the present embodiment. In the present embodiment, an optical filter 70 is provided inside the body 11. The optical filter 70 is disposed on the optical axis OP of the imaging lens 12 attached onto the body 11. The optical filter 70 separates the incident rays into a plurality of pieces and causes the imaging lens 12 to be incident on the light-receiving surface 20A of the imaging sensor 20.

The optical filter 70 separates the incident rays in the X direction and the Y direction. The optical filter 70 is a low-pass filter which performs so-called four-point separation. The optical filter 70 is able to change a first separation width, which is the separation width of the rays in the X direction, and a second separation width, which is the separation width in the Y direction.

Figure 19:
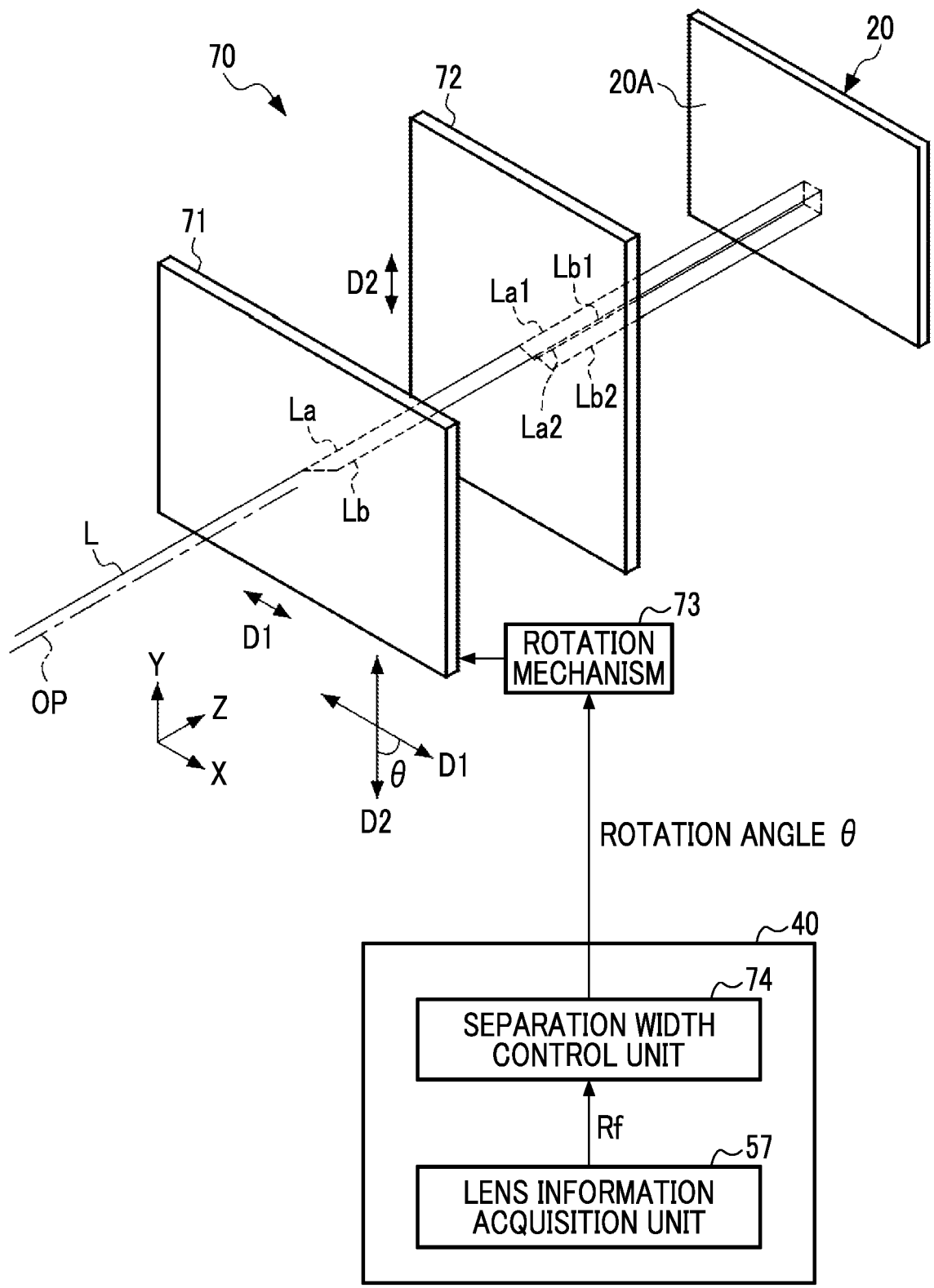
FIG. 19 is a diagram showing a configuration of an optical filter according to a sixth embodiment.

FIG. 19 shows a configuration of the optical filter 70. The optical filter 70 is composed of a first double refraction plate 71, a second double refraction plate 72, and a rotation mechanism 73. The first double refraction plate 71 separates the incident rays in a first separation direction D1. The second double refraction plate 72 separates the incident rays in a second separation direction D2.

Specifically, the first double refraction plate 71 separates incident ray L into a ray La as a normal ray and a ray Lb as an abnormal ray. The ray La and the ray Lb separated by the first double refraction plate 71 are incident on the second double refraction plate 72. The second double refraction plate 72 separates the incident ray La into ray La1 as a normal ray and ray La2 as an abnormal ray, and separates the incident ray Lb into ray Lb1 as a normal ray and ray Lb2 as an abnormal ray. Therefore, the first double refraction plate 71 and the second double refraction plate 72 separate one ray L into four rays La1, La2, Lb1, and Lb2.

The rotation mechanism 73 changes an angle θ between the first separation direction D1 and the second separation direction D2 by rotating the first double refraction plate 71 about the optical axis OP. The rotation mechanism 73 is controlled by a separation width control unit 74 configured in the main control unit 40. The separation width control unit 74 determines the angle θ on the basis of the focal length information 35B which is included in the lens information 35A acquired by the lens information acquisition unit 57. The separation width control unit 74 sets such that θ=90° in a case where the focal length ratio Rf is 1. In a case where the focal length ratio Rf is greater than 1, the separation width control unit 74 sets the angle θ as an angle corresponding to the focal length ratio Rf.

Figure 20:
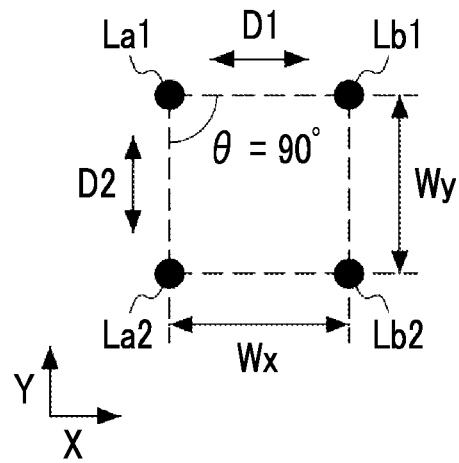
FIG. 20 is a diagram showing four-point separation in a case where Rf=1.
Figure 21:
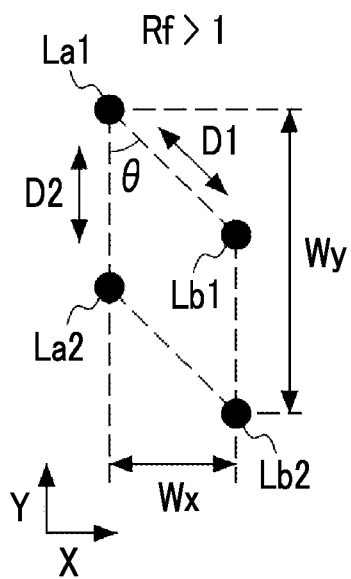
FIG. 21 is a diagram showing four-point separation in a case where Rf>1.

FIGS. 20 and 21 show four rays La1, La2, Lb1, and Lb2 separated by an optical filter 70. FIG. 20 shows four-point separation in the case where Rf=1. FIG. 21 shows four-point separation in a case where Rf>1.

As shown in FIG. 20, in a case where Rf=1, by setting such that θ=90°, the first separation width Wx of the four-point separation in the X direction and the second separation width Wy of the four-point separation in the Y direction are equal. The first separation width Wx corresponds to the cut-off frequency in the X direction. The second separation width Wy corresponds to the cut-off frequency in the Y direction. Therefore, in a case where Rf=1, the cut-off frequencies of the optical filters 70 are the same in the X direction and the Y direction.

As shown in FIG. 21, in a case where Rf>1, by setting such that θ<90°, the second separation width Wy is greater than the first separation width Wx. Therefore, in a case where Rf>1, the cut-off frequency in the Y direction by the optical filter 70 is smaller than the cut-off frequency in the X direction. Therefore, in a case where Rf>1, the optical filter 70 removes more high-frequency components in the Y direction than high-frequency components in the X direction.

In a case where Rf>1, when an imaging signal is read out from the imaging sensor 20 to generate the raw image, pixels are thinned out more in the Y direction than in the X direction. Therefore, a false signal tends to occur in the Y direction in the raw image. The separation width control unit 74 controls the rotation mechanism 73 such that θ<90° in a case where Rf>1 and increases the second separation width Wy relative to the first separation width Wx so as to suppress occurrence of false signals more in the Y direction than in the X direction.

It is preferable that the separation width control unit 74 determines the angle θ such that a ratio (Wy/Wx) of the second separation width Wy to the first separation width Wx matches with the focal length ratio Rf.

Figure 22:
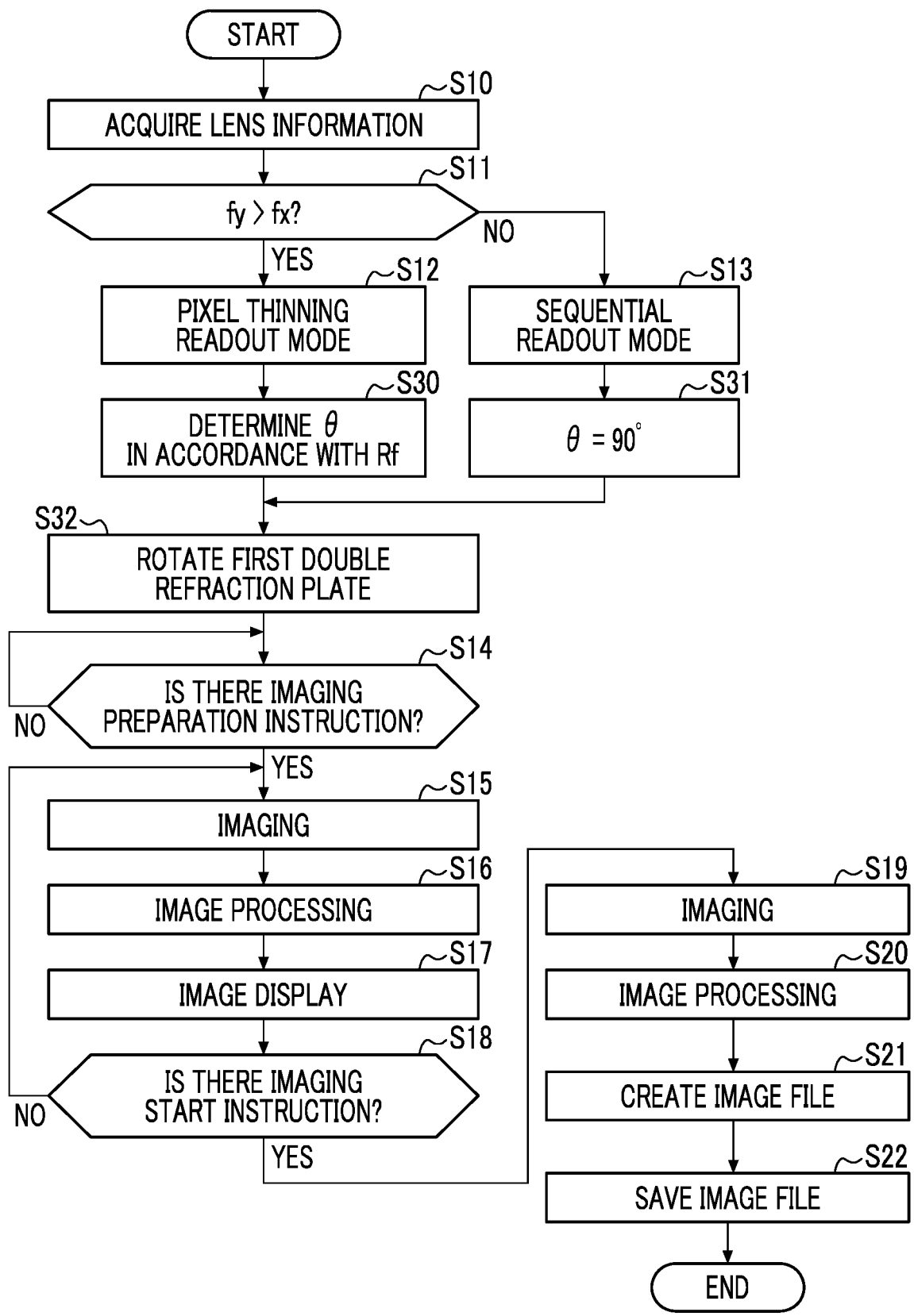
FIG. 22 is a flowchart showing operations of the imaging apparatus according to the sixth embodiment.

Next, an operation of the imaging apparatus 10 will be described. FIG. 22 is a flowchart showing an example of a flow of processing which is executed by the main control unit 40 (refer to FIGS. 6 and 7). The flowchart shown in FIG. 22 is the same as the flowchart shown in FIG. 14 except that steps S30 to S32, which are processing performed by the separation width control unit 74, are added.

In step S12, in a case where the sensor control unit 53 selects the pixel thinning-out readout mode, the processing proceeds to step S30. In step S30, the separation width control unit 74 determines the angle θ in accordance with the focal length ratio Rf. The separation width control unit 74 determines, for example, the angle θ such that the ratio (Wy/Wx) of the second separation width Wy to the first separation width Wx matches with the focal length ratio Rf.

In step S13, in a case where the sensor control unit 53 selects the sequential readout mode, the processing proceeds to step S31. In step S31, the separation width control unit 74 determines the angle θ such that the angle θ is 90°.

After step S30 or step S31, the processing proceeds to step S32. In step S32, the separation width control unit 74 controls the rotation mechanism 73 on the basis of the angle θ determined in step S30 or step S31 to rotate the first double refraction plate 71. After step S32, the processing proceeds to step S14. The processing of transitioning to step S14 is the same as that of the first embodiment.

In the present embodiment, although the rotation mechanism 73 rotates the first double refraction plate 71, the second double refraction plate 72 may be rotated.

Further, in the present embodiment, as the optical filter 70, an optical low-pass filter capable of changing the separation width in the two directions by rotating the double refractive index plate is used. However, the optical low-pass filter capable of electrically changing the separation width in the two directions may be used. For example, it is possible to use the liquid crystal optical filter disclosed in JP2007-104419A.

Hereinafter, modification examples of the above-mentioned embodiments will be described.

First Modification Example

In each of the above-mentioned embodiments, the focal length determination unit 58 determines the length of the second focal length fy relative to the first focal length fx on the basis of the focal length information 35B included in the lens information 35A acquired by the lens information acquisition unit 57. The focal length determination unit 58 may determine the length of the second focal length fy relative to the first focal length fx on the basis of the input information input by the user using the operating part 43. For example, the input information is the above-mentioned focal length ratio Rf. In such a case, the input receiving unit 51 receives the focal length ratio Rf input using the operating part 43. The focal length determination unit 58 makes determination on the basis of the focal length ratio Rf received by the input receiving unit 51.

Figure 23:
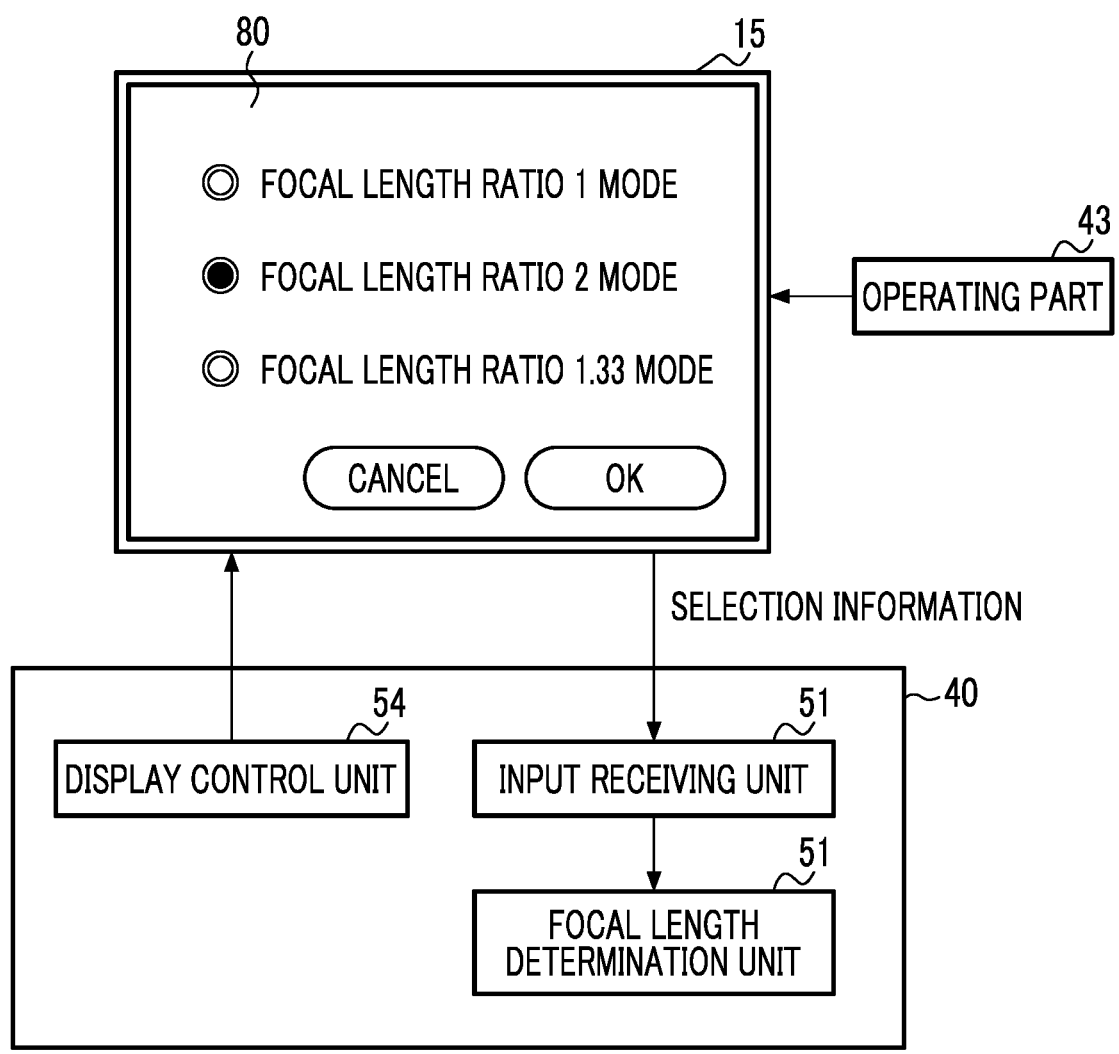
FIG. 23 is a diagram showing a mode selection screen according to a first modification example.

Further, the input information may be selection information for selecting one mode from a plurality of modes relating to the focal length ratio Rf. For example, as shown in FIG. 23, the display control unit 54 displays the mode selection screen 80 on the display 15. The mode selection screen 80 displays a mode corresponding to the focal length ratio Rf of the imaging lens 12 that can be attached onto the body 11. A "focal length ratio 1 mode" is a mode corresponding to the second lens 12B. A "focal length ratio 2 mode" is a mode corresponding to the first lens 12A having a relationship of "Rf=2". A "focal length ratio 1.33 mode" is a mode corresponding to the first lens 12A having a relationship of "Rf=4/3".

A user is able to perform the mode selection operation displayed on the mode selection screen 80 by the operating part 43. The input receiving unit 51 receives the selection information of the mode which is selected by the selection operation as the input information. The focal length determination unit 58 makes a determination on the basis of the input information which is received by the input receiving unit 51.

Further, the imaging lens 12 may store type information that indicates the type of the imaging lens 12 as the lens information 35A. The focal length determination unit 58 may determine the length of the second focal length fy relative to the first focal length fx on the basis of the type information included in the lens information 35A acquired by the lens information acquisition unit 57.

Second Modification Example

In each of the above-mentioned embodiments, in a case where the imaging signal is read out from the pixel region 21 to the signal line 23A by the operation of the vertical scanning circuit 22, or in a case where the imaging signal is read out from the line memory 23 to the horizontal output line 24A by the operation of the horizontal scanning circuit 24, pixel thinning-out is performed. The present disclosure is not limited to this. The pixel thinning-out may be performed in a case of reading out the imaging signal from the image memory after an image memory is provided in the imaging sensor 20 and the imaging signal is read out from the pixel region 21 without performing pixel thinning-out and is stored in the image memory.

Figure 24:
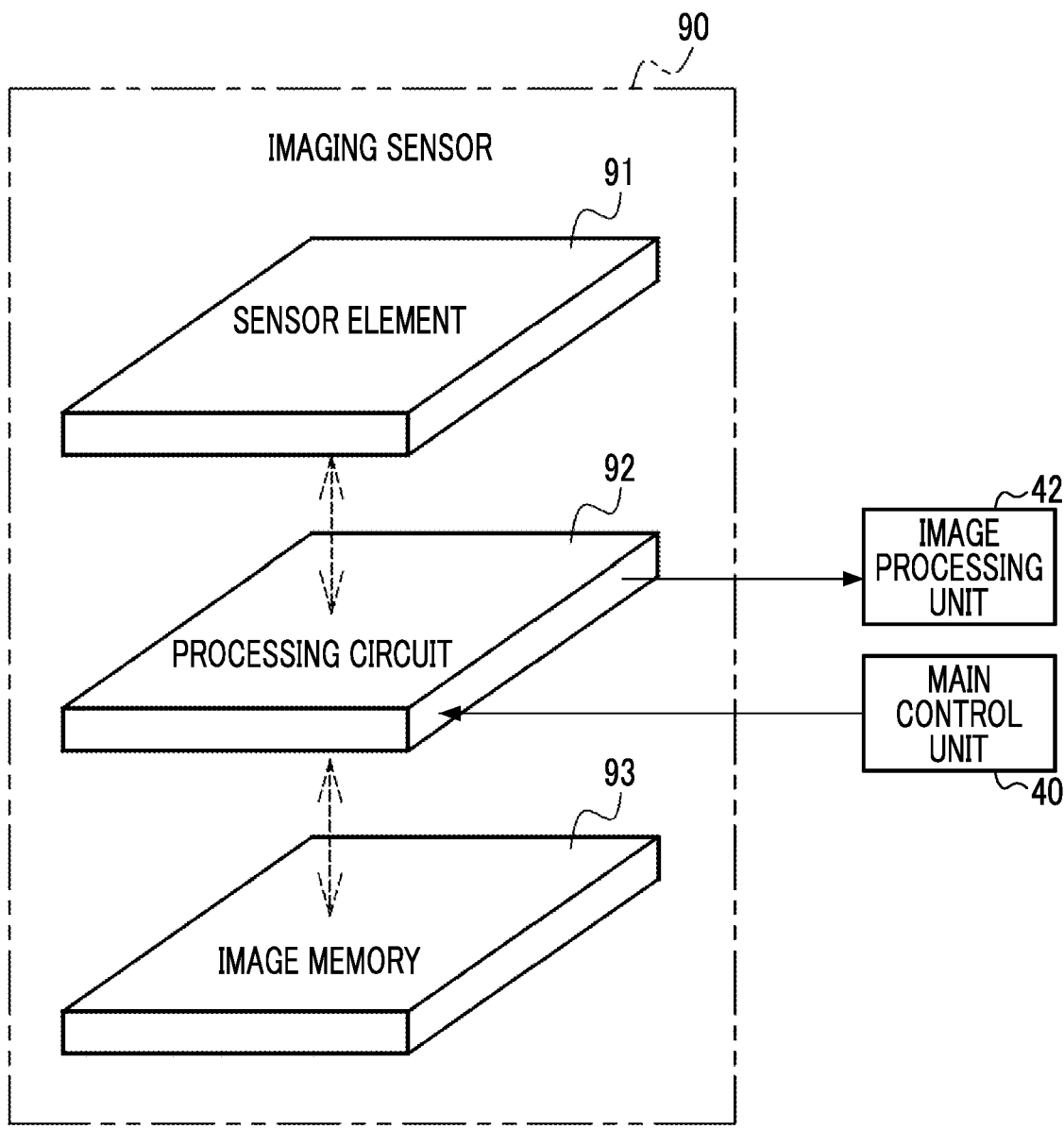
FIG. 24 is a diagram showing a configuration of a lamination-type imaging sensor according to a second modification example.

In such a case, for example, a lamination-type imaging sensor 90 shown in FIG. 24 can be used. As shown in FIG. 24, for example, a sensor element 91, a processing circuit 92, and an image memory 93 may be built in the lamination-type imaging sensor 90. The sensor element 91, the processing circuit 92, and the image memory 93 are made as one package. The processing circuit 92 and the image memory 93 are laminated on the imaging sensor 90. Specifically, the sensor element 91 and the processing circuit 92 are electrically connected to each other by a conductive bump (not shown) of copper or the like. The processing circuit 92 and the image memory 93 are also electrically connected to each other by a conductive bump (not shown) of copper or the like.

The processing circuit 92 is, for example, a device which includes an ASIC or an FPGA. The image memory 93 is, for example, DRAM. However, SRAM may be adopted as the image memory 93 instead of the DRAM. The processing circuit 92 is connected to the main control unit 40 and the image processing unit 42.

The processing circuit 92 controls the entire sensor element 91 in accordance with the instruction of the main control unit 40. A computer which includes a CPU, a storage, and a memory may be adopted as the processing circuit 92. The number of CPUs may be singular or plural. Further, the processing circuit 92 may be implemented by a combination of a hardware configuration and a software configuration.

The sensor element 91 has, for example, the same configuration as the imaging sensor 20 according to the first embodiment. The processing circuit 92 reads out an imaging signal obtained by imaging the subject by the sensor element 91. The processing circuit 92 performs A/D conversion on the imaging signal which is read out from the imaging sensor 20 and stores it in the image memory 93.

The processing circuit 92 performs random access on the image memory 93. The processing circuit 92 reads out the imaging signal stored in the image memory 93 and inputs the imaging signal to the image processing unit 42. In a case where fy>fx, the processing circuit 92 performs the same pixel thinning-out readout as in the first embodiment in a case where an imaging signal is read out from the image memory 93. Therefore, the resolution ratio of the raw image generated by the image processing unit 42 is Rd is set to be higher than the resolution ratio Rs of the sensor element 91.

In each of the above-mentioned embodiments, various processors shown below can be used as the hardware structure of the control unit using the main control unit 40 as an example. The various processors include, in addition to the CPU, which is a general-purpose processor that functions by executing software (program), a processor such as an FPGA of which the circuit configuration can be changed after manufacturing. The FPGA includes a dedicated electric circuit, which is a processor having a circuit configuration specially designed for executing a specific processing, such as PLD or ASIC.

The control unit may be configured as one of the various processors, or may be configured as a combination of two or more of the same or different kinds of processors (for example, a combination of a plurality of FPGAs or a combination of a CPU and an FPGA). Further, the plurality of control units may be constituted of one processor.

A plurality of examples in which a plurality of control units are configured as one processor can be considered. In the first example, as represented by computers such as a client and a server, there is a form in which one processor is constituted of a combination of one or more CPUs and software and this processor functions as a plurality of control units. As a second example, as typified by system on chip (SOC), there is a form in which a processor that implements the functions of the whole system which includes a plurality of control units with one IC chip is used. As described above, the control unit can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. Further, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

EXPLANATION OF REFERENCES 10,10A: imaging apparatus
11: body
11A: camera side mount
11B: electric contact
11C: front surface
11D: rear surface
12: imaging lens
12A: first lens
12B: second lens
13: dial
14: release button
15: display
16: instruction button
17: finder
18: finder eyepiece portion
19: lens side mount
19A: electric contact
20: imaging sensor
20A: light-receiving surface
21: pixel region
22: vertical scanning circuit
22A: gate line
23: line memory
23A: signal line
24: horizontal scanning circuit
24A: horizontal output line
25: output amplifier
26: pixel
27: photoelectric conversion element
28, 29: transistor
30: cylindrical lens
30A: concave cylindrical lens
30B: convex cylindrical lens
31: focus lens
34: lens driving control unit
35: memory
35A: lens information
35B: focal length information
40: main control unit
41: memory
41A: operation program
42: image processing unit
43: operating part
51: input receiving unit
52: lens control unit
53: sensor control unit
54: display control unit
55: image file generation unit
56: memory control unit
57: lens information acquisition unit
58: focal length determination unit
59: resolution ratio determination unit
61: first image
62: second image
63: third image
64: focus area
70: optical filter
71: first double refraction plate
72: second double refraction plate
73: rotation mechanism
74: separation width control unit
80: mode selection screen
90: imaging sensor
91: sensor element
92: processing circuit
93: image memory
D1: first separation direction
D2: second separation direction
Dx: first resolution
Dy: second resolution
FV: visual field
L, La1, La2, Lb1, Lb2: ray
OP: optical axis
RP: raw image
Rd: resolution ratio of raw image
Rs: resolution ratio of imaging sensor
Rf: focal length ratio
S: imaging signal
H: subject
HI: subject image
Sa, Sb: addition imaging signal
Wx: first separation width
Wy: second separation width
fx: first focal length
fy: second focal length

What is claimed is:

1. An imaging apparatus comprising:
   an imaging sensor that has a plurality of pixels arranged along a first direction and a second direction, the first direction intersecting with an extending direction of an optical axis of a lens, and the second direction intersecting with the extending direction and the first direction;
   a lens mount to which the lens forming an image of a ray onto the imaging sensor is attached; and
   a processor that is configured to read out an imaging signal from the imaging sensor and generate a raw image,
   wherein the processor is configured to:
     determine a length of a second focal length in the second direction relative to a first focal length in the first direction; and perform pixel thinning-out readout in at least the second direction of the first direction and the second direction so as to make a resolution ratio of the raw image higher than a resolution ratio of the imaging sensor in a case where the second focal length is longer than the first focal length, the resolution ratio of the raw image being a ratio of a resolution of the raw image in the first direction to a resolution of the raw image in the second direction, and the resolution ratio of the imaging sensor being a ratio of a resolution of the imaging sensor in the first direction to a resolution of the imaging sensor in the second direction.

2. The imaging apparatus according to claim 1, wherein the pixel thinning-out readout is a thinning-out readout by addition, in which the number of imaging signals of a plurality of pixels is reduced by adding and reading out the imaging signals.

3. The imaging apparatus according to claim 1, wherein the processor is configured to perform the pixel thinning-out readout in the first direction in accordance with a focal length ratio of the second focal length to the first focal length.

4. The imaging apparatus according to claim 1, wherein in a case where the second focal length is longer than the first focal length, the processor is configured to match the resolution ratio of the raw image with a focal length ratio of the second focal length to the first focal length.

5. The imaging apparatus according to claim 4, wherein in a case where the focal length ratio is 4/3, the processor is configured to set the resolution ratio of the raw image to 4/3 by performing a 1/3 pixel thinning-out readout in the first direction and a 1/4 pixel thinning-out readout in the second direction.

6. The imaging apparatus according to claim 1, wherein the processor is configured to:
read out storage information about the first focal length and the second focal length stored in the lens; and
determine a length of the second focal length relative to the first focal length on the basis of the storage information so as to determine the resolution ratio of the raw image on the basis of the storage information, in a case where the second focal length is longer than the first focal length.

7. The imaging apparatus according to claim 1, wherein the processor is configured to:
receive user's input information about the first focal length and the second focal length; and
determine a length of the second focal length relative to the first focal length on the basis of the input information so as to determine the resolution ratio of the raw image on the basis of the input information, in a case where the second focal length is longer than the first focal length.

8. The imaging apparatus according to claim 1, further comprising a display that displays an image on the basis of the imaging signal during imaging or after imaging,
wherein the processor is configured to selectively execute a first display mode in which a first image is displayed on the display and a second display mode in which a second image is displayed on the display, and
an aspect ratio, which is a ratio of a length of the first image in the first direction to a length of the first image in the second direction, is greater than an aspect ratio of the second image.

9. The imaging apparatus according to claim 8, wherein the processor is configured to:
receive user's selection information about selection of the first display mode and the second display mode; and
execute the first display mode or the second display mode on the basis of the selection information.

10. The imaging apparatus according to claim 8, wherein the processor is configured to:
receive a user's focusing confirmation instruction for confirmation of a focusing state; and
execute an enlarged display mode, in which the first image is enlarged and displayed on the display on the basis of the focusing confirmation instruction, in a case where the second display mode is selected.

11. The imaging apparatus according to claim 1, further comprising:
an optical filter that separates a plurality of rays incident from the lens,
wherein the plurality of rays separated by the optical filter are incident on the imaging sensor.

12. The imaging apparatus according to claim 11, wherein the optical filter is able to change a first separation width of the rays in the first direction and a second separation width of the rays in the second direction, and the processor is configured to:
increase the second separation width relative to the first separation width in a case where the second focal length is longer than the first focal length.

13. The imaging apparatus according to claim 1, wherein the raw image generated by reading out the imaging signal from the imaging sensor is stored as a RAW image file in a storage unit.

14. An imaging apparatus comprising:
an imaging sensor;
a lens mount to which a lens forming an image of a ray onto the imaging sensor is attached;
a processor that is configured to read out an imaging signal from the imaging sensor and generate a raw image; and
a display that displays an image on the basis of the imaging signal during imaging or after imaging,
wherein the processor is configured to:
determine a length of a second focal length in a second direction relative to a first focal length in a first direction, the first direction intersecting with an extending direction of an optical axis of the lens, and the second direction intersecting with the extending direction and the first direction;
make a resolution ratio of the raw image higher than a resolution ratio of the imaging sensor in a case where the second focal length is longer than the first focal length, the resolution ratio of the raw image being a ratio of a resolution of the raw image in the first direction to a resolution of the raw image in the second direction, and the resolution ratio of the imaging sensor being a ratio of a resolution of the imaging sensor in the first direction to a resolution of the imaging sensor in the second direction; and
selectively execute a first display mode in which a first image is displayed on the display and a second display mode in which a second image is displayed on the display, an aspect ratio which is a ratio of a length of the first image in the first direction to a length of the first image in the second direction being greater than an aspect ratio of the second image, and wherein the first display mode is a mode in which the imaging signal which is read out from the imaging sensor is displayed as the first image in a state where the aspect ratio is maintained, and the second display mode is a mode in which the imaging signal which is read out from the imaging sensor is displayed as the second image of which the aspect ratio is converted on the basis of the first focal length and the second focal length.

15. The imaging apparatus according to claim 14, wherein the processor is configured to:
store the raw image, which is generated by reading out the imaging signal from the imaging sensor, in a storage unit.

16. The imaging apparatus according to claim 15, wherein the processor is configured to:
generate an image file by adding information about the first focal length and the second focal length to the raw image; and
store the generated image file in the storage unit.

17. An operation method of the imaging apparatus according to claim 1 including the imaging sensor that has the plurality of pixels arranged along the first direction and the second direction, and the lens mount to which the lens forming the image of the ray onto the imaging sensor is attached, the first direction intersecting with the extending direction of the optical axis of the lens, and the second direction intersecting with the extending direction and the first direction, the operation method comprising:
determining a magnitude of the second focal length in the second direction relative to the first focal length in the first direction; and
performing the pixel thinning-out readout in at least the second direction of the first direction and the second direction so as to make the resolution ratio of the raw image higher than the resolution ratio of the imaging sensor in the case where the second focal length is longer than the first focal length, the resolution ratio of the raw image being the ratio of the resolution of the raw image in the first direction to the resolution of the raw image in the second direction, and the resolution ratio of the imaging sensor being the ratio of the resolution of the imaging sensor in the first direction to the resolution of the imaging sensor in the second direction.

18. An operation method of the imaging apparatus according to claim 14 including the imaging sensor, the lens mount to which the lens forming the image of the ray onto the imaging sensor is attached, and the display that displays the image on the basis of the imaging signal during imaging or after imaging, the operation method comprising:
determining a magnitude of the second focal length in the second direction relative to the first focal length in the first direction, the first direction intersecting with the extending direction of the optical axis of the lens, and the second direction intersecting with the extending direction and the first direction;
making the resolution ratio of the raw image higher than the resolution ratio of the imaging sensor in the case where the second focal length is longer than the first focal length, the resolution ratio of the raw image being the ratio of the resolution of the raw image in the first direction to the resolution of the raw image in the second direction, and the resolution ratio of the imaging sensor being the ratio of the resolution of the imaging sensor in the first direction to the resolution of the imaging sensor in the second direction; and selectively executing the first display mode in which the first image is displayed on the display and the second display mode in which the second image is displayed on the display, the aspect ratio which is the ratio of the length of the first image in the first direction to the length of the first image in the second direction being greater than the aspect ratio of the second image, wherein the first display mode is the mode in which the imaging signal which is read out from the imaging sensor is displayed as the first image in the state where the aspect ratio is maintained, and the second display mode is the mode in which the imaging signal which is read out from the imaging sensor is displayed as the second image of which the aspect ratio is converted on the basis of the first focal length and the second focal length.

19. A non-transitory computer readable recording medium storing an operation program that operates the imaging apparatus according to claim 1 including the imaging sensor that has the plurality of pixels arranged along the first direction and the second direction, the lens mount to which the lens forming the image of the ray onto the imaging sensor is attached, and the processor that is configured to read out the imaging signal from the imaging sensor and generate the raw image, the first direction intersecting with the extending direction of the optical axis of the lens, and the second direction intersecting with the extending direction and the first direction, the operation program causing the processor to execute:
determining the length of the second focal length in the second direction relative to the first focal length in the first direction; and
performing the pixel thinning-out readout in at least the second direction of the first direction and the second direction so as to make the resolution ratio of the raw image higher than the resolution ratio of the imaging sensor in the case where the second focal length is longer than the first focal length, the resolution ratio of the raw image being the ratio of the resolution of the raw image in the first direction to the resolution of the raw image in the second direction, and the resolution ratio of the imaging sensor being the ratio of the resolution of the imaging sensor in the first direction to the resolution of the imaging sensor in the second direction.

20. A non-transitory computer readable recording medium storing an operation program that operates the imaging apparatus claim 14 including the imaging sensor, the lens mount to which the lens forming the image of the ray onto the imaging sensor is attached, the processor that is configured to read out the imaging signal from the imaging sensor and generate the raw image, and the display that displays the image on the basis of the imaging signal during imaging or after imaging the operation program causing the processor to execute:
determining the length of the second focal length in the second direction relative to the first focal length in the first direction, the first direction intersecting with the extending direction of the optical axis of the lens, and the second direction intersecting with the extending direction and the first direction;
making the resolution ratio of the raw image higher than the resolution ratio of the imaging sensor in the case where the second focal length is longer than the first focal length, the resolution ratio of the raw image being the ratio of the resolution of the raw image in the first direction to the resolution of the raw image in the second direction, and the resolution ratio of the imaging sensor being the ratio of the resolution of the imaging sensor in the first direction to the resolution of the imaging sensor in the second direction; and selectively executing the first display mode in which the first image is displayed on the display and the second display mode in which the second image is displayed on the display, the aspect ratio which is the ratio of the length of the first image in the first direction to the length of the first image in the second direction being greater than the aspect ratio of the second image, wherein the first display mode is the mode in which the imaging signal which is read out from the imaging sensor is displayed as the first image in the state where the aspect ratio is maintained, and the second display mode is the mode in which the imaging signal which is read out from the imaging sensor is displayed as the second image of which the aspect ratio is converted on the basis of the first focal length and the second focal length.

* * * * *